US012812427B2

(12) United States Patent
Huang et al.

(10) Patent No.: US 12,812,427 B2
(45) Date of Patent: Nov. 24, 2026

(54) COMMUNICATION APPARATUS AND COMMUNICATION METHOD FOR CHANNEL SOUNDING

(71) Applicant: Panasonic Intellectual Property Corporation of America, Torrance, CA (US)

(72) Inventors: Lei Huang, Singapore (SG); Yoshio Urabe, Nara (JP); Rojan Chitrakar, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 633 days.

(21) Appl. No.: 17/914,721

(22) PCT Filed: Feb. 25, 2021

(86) PCT No.: PCT/SG2021/050091

§ 371 (c)(1),
(2) Date: Sep. 26, 2022

(87) PCT Pub. No.: WO2021/201771

PCT Pub. Date: Oct. 7, 2021

(65) Prior Publication Data

US 2023/0141486 A1 May 11, 2023

(30) Foreign Application Priority Data

Apr. 3, 2020 (SG) .......................... 10202003138U

(51) Int. Cl.
*H04W 24/10* (2009.01)
*H04B 7/06* (2006.01)
(Continued)

(52) U.S. Cl.
CPC .......... *H04W 24/10* (2013.01); *H04B 7/0632* (2013.01); *H04L 5/0051* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 11,641,633 B1 * | 5/2023 | Cao | H04W 56/0045 370/336 |
| 2012/0127899 A1 * | 5/2012 | Ketchum | H04L 25/03343 370/310 |

(Continued)

FOREIGN PATENT DOCUMENTS

| | | | | |
|---|---|---|---|---|
| JP | WO2020217711 | * | 3/2020 | H04B 7/024 |
| WO | WO2020/182040 | * | 3/2020 | H04B 7/024 |

OTHER PUBLICATIONS

Doostnejad, et al., "Opportunistic Implicit Channel Sounding," IEEE 802.11-20-0086-r1, Feb. 27, 2020. (13 pages).

(Continued)

*Primary Examiner* — Mansour Oveissi
*Assistant Examiner* — Ning Li
(74) *Attorney, Agent, or Firm* — Seed Intellectual Property Law Group LLP

(57) ABSTRACT

The present disclosure provides a communication apparatus comprising: circuitry, which, in operation, generates a first frame for a sounding procedure; and a transmitter, which, in operation, transmits the first frame to each of one or more peer communication apparatuses, the first frame comprising a first field which indicates an intended usage of the sounding procedure.

12 Claims, 31 Drawing Sheets

(51) Int. Cl.

| | |
|---|---|
| ***H04L 1/00*** | (2006.01) |
| ***H04L 5/00*** | (2006.01) |
| ***H04L 25/02*** | (2006.01) |
| ***H04L 27/26*** | (2006.01) |
| ***H04W 72/0446*** | (2023.01) |
| ***H04W 84/12*** | (2009.01) |

(56) References Cited

U.S. PATENT DOCUMENTS

| | | | | |
|---|---|---|---|---|
| 2015/0270880 | A1* | 9/2015 | Harel | H04B 7/0452 370/338 |
| 2016/0165630 | A1* | 6/2016 | Oteri | H04W 74/04 370/336 |
| 2018/0206274 | A1 | 7/2018 | Cherian et al. | |
| 2018/0234135 | A1* | 8/2018 | Vermani | H04W 72/29 |
| 2019/0028168 | A1* | 1/2019 | Vermani | H04B 7/0617 |
| 2019/0045366 | A1* | 2/2019 | Vermani | H04W 16/06 |
| 2019/0081664 | A1* | 3/2019 | Vermani | H04L 5/0035 |
| 2020/0045560 | A1* | 2/2020 | Vermani | H04B 7/024 |
| 2020/0076552 | A1* | 3/2020 | Cherian | H04L 5/0035 |
| 2020/0358486 | A1* | 11/2020 | Suh | H04L 27/2602 |
| 2020/0403680 | A1* | 12/2020 | Li | H04B 7/0632 |
| 2021/0044333 | A1* | 2/2021 | Jiang | H04B 7/0619 |
| 2021/0143878 | A1* | 5/2021 | Suh | H04B 7/0417 |
| 2021/0307099 | A1* | 9/2021 | Ryu | H04W 76/15 |
| 2021/0409075 | A1* | 12/2021 | Yang | H04W 74/04 |
| 2021/0409179 | A1* | 12/2021 | Yang | H04L 5/0046 |
| 2022/0116807 | A1* | 4/2022 | Hirata | H04L 5/0057 |
| 2022/0124770 | A1* | 4/2022 | Yukawa | H04W 72/20 |
| 2022/0209825 | A1* | 6/2022 | Chitrakar | H04W 28/02 |

OTHER PUBLICATIONS

International Search Report, mailed Jun. 9, 2021, for International Patent Application No. PCT/SG2021/050091. (4 pages).

Extended European Search Reported dated Aug. 3, 2023, for the corresponding European Patent Application No. 21782269.1, 9 pages.

Lou et al., "A Comparison of Implicit and Explicit Channel Feedback Methods for MU-MIMO WLAN Systems," InterDigital Communications, LLC, 6 pages.

Ryu et al., LG Electronics, "Considerations on multi-AP coordination for EHT," doc.: IEEE802.11-18/1982r0, Nov. 2018, 9 pages.

Yu et al., "Sounding procedure in AP collaboration," doc.: IEEE 802.11-19/1097r0, Jul. 2019, 11 pages.

* cited by examiner

COMMUNICATION APPARATUS AND COMMUNICATION METHOD FOR CHANNEL SOUNDING

TECHNICAL FIELD

The present disclosure relates to communication apparatuses and methods for channel sounding, and more particularly to communication apparatuses and methods for channel sounding in EHT WLAN (extremely high throughput wireless local area network).

BACKGROUND

In the standardization of next generation wireless local area network (WLAN), a new radio access technology necessarily having backward compatibilities with IEEE 802.11a/b/g/n/ac/ax technologies has been discussed in the IEEE 802.11 Working Group and is named IEEE 802.11be Extremely High Throughput (EHT) WLAN.

In 802.11be EHT WLAN, in order to provide significant peak throughput and capacity increase beyond 802.11ax high efficiency (HE) WLAN, especially for cell-edge STAs, it has been proposed to enable multiple access point (multi-AP) coordination in a multi-AP system.

However, there has been no much discussion on communication apparatuses and methods for channel sounding, specifically on efficient procedure on multi-AP based sounding.

There is thus a need for communication apparatuses and methods that provide feasible technical solutions for channel sounding in the context of EHT WLAN. Furthermore, other desirable features and characteristics will become apparent from the subsequent detailed description and the appended claims, taken in conjunction with the accompanying drawings and this background of the disclosure.

SUMMARY

Non-limiting and exemplary embodiments facilitate providing communication apparatuses and communication methods for channel sounding in context of EHT WLAN.

In a first aspect, the present disclosure provides a communication apparatus comprising: circuitry, which, in operation, generates a first frame for a sounding procedure; and a transmitter, which, in operation, transmits the first frame to each of one or more peer communication apparatuses, the first frame comprising a first field which indicates an intended usage of the sounding procedure.

In a second aspect, the present disclosure provides a peer communication apparatus comprising: a receiver, which, in operation, receives a first frame for a sounding procedure from a communication apparatus; and circuitry, which, in operation, processes the first frame, the first frame comprising a first field which indicates an intended usage of the sounding procedure.

In a third aspect, the present disclosure provides a communication method comprising: generating a first frame for a sounding procedure; and transmitting the first frame to each of one or more peer communication apparatuses, the first frame comprising a first field which indicates an intended usage of the sounding procedure.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which:

FIG. 10 depicts a flow chart illustrating multi-AP based explicit joint sounding procedure according to an embodiment.

Figure 1A:
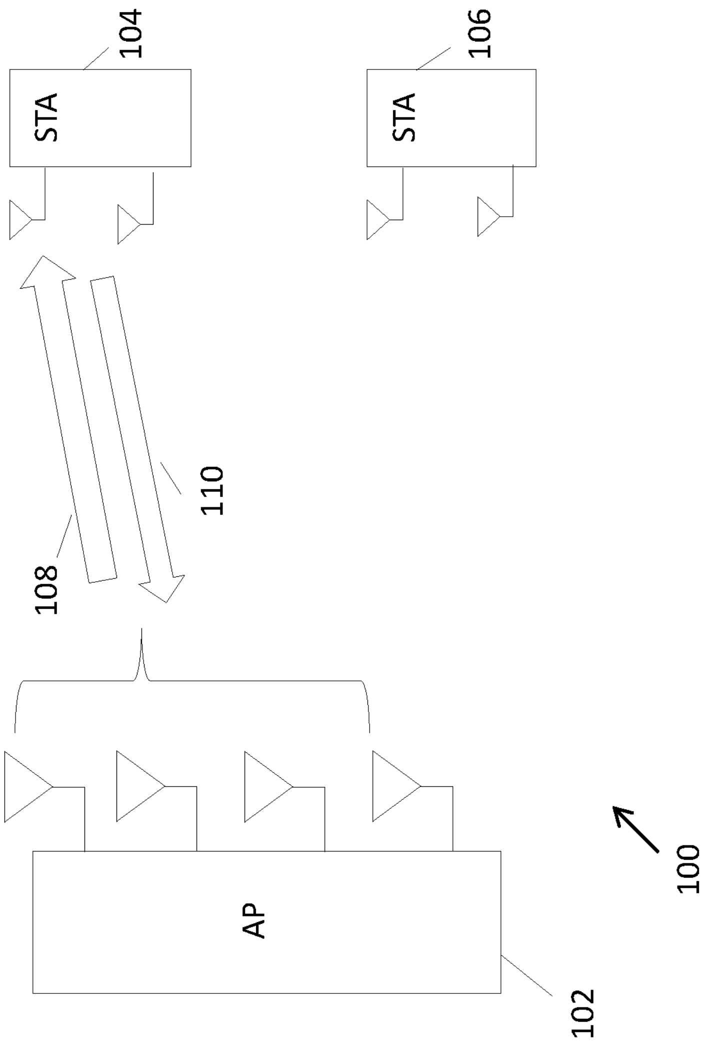
FIG. 1A depicts a schematic diagram of uplink and downlink single-user (SU) multiple input multiple output (MIMO) communication between an access point (AP) and a station (STA) in a MIMO wireless network.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help an accurate understanding of the present embodiments.

DETAILED DESCRIPTION

Some embodiments of the present disclosure will be described, by way of example only, with reference to the drawings. Like reference numerals and characters in the drawings refer to like elements or equivalents.

In the following paragraphs, certain exemplifying embodiments are explained with reference to an access point (AP) and a station (STA) for uplink or downlink channel sounding, especially in a multiple-input multiple-output (MIMO) wireless network.

In the context of IEEE 802.11 (Wi-Fi) technologies, a station, which is interchangeably referred to as a STA, is a communication apparatus that has the capability to use the 802.11 protocol. Based on the IEEE 802.11-2016 definition, a STA can be any device that contains an IEEE 802.11-conformant media access control (MAC) and physical layer (PHY) interface to the wireless medium (WM).

For example, a STA may be a laptop, a desktop personal computer (PC), a personal digital assistant (PDA), an access point or a Wi-Fi phone in a wireless local area network (WLAN) environment. The STA may be fixed or mobile. In the WLAN environment, the terms "STA", "wireless client", "user", "user device", and "node" are often used interchangeably.

Likewise, an AP, which may be interchangeably referred to as a wireless access point (WAP) in the context of IEEE 802.11 (Wi-Fi) technologies, is a communication apparatus that allows STAs in a WLAN to connect to a wired network. The AP usually connects to a router (via a wired network) as a standalone device, but it can also be integrated with or employed in the router.

As mentioned above, a STA in a WLAN may work as an AP at a different occasion, and vice versa. This is because communication apparatuses in the context of IEEE 802.11 (Wi-Fi) technologies may include both STA hardware components and AP hardware components. In this manner, the communication apparatuses may switch between a STA mode and an AP mode, based on actual WLAN conditions and/or requirements.

In a MIMO wireless network, "multiple" refers to multiple antennas used simultaneously for transmission and multiple antennas used simultaneously for reception, over a radio channel. In this regard, "multiple-input" refers to multiple transmitter antennas, which input a radio signal into the channel, and "multiple-output" refers to multiple receiver antennas, which receive the radio signal from the channel and into the receiver. For example, in an N×M MIMO network system, N is the number of transmitter antennas, M is the number of receiver antennas, and N may or may not be equal to M. For the sake of simplicity, the respective numbers of transmitter antennas and receiver antennas are not discussed further in the present disclosure.

In a MIMO wireless network, single-user (SU) communications and multi-user (MU) communications can be deployed for communications between communication apparatuses such as APs and STAs. MIMO wireless network has benefits like spatial multiplexing and spatial diversity, which enable higher data rates and robustness through the use of multiple spatial streams. According to various embodiments, the term "spatial stream" may be used interchangeably with the term "space-time stream" (or STS).

FIG. 1A depicts a schematic diagram of SU communication 100 between an AP 102 and a STA 104 in a MIMO wireless network. As shown, the MIMO wireless network may include one or more STAs (e.g. STA 104, STA 106, etc.). If the SU communication 100 in a channel is carried out over whole channel bandwidth, it is called full bandwidth SU communication. If the SU communication 100 in a channel is carried out over a part of the channel bandwidth (e.g. one or more 20 MHz subchannels within the channel is punctured), it is called punctured SU communication. In the SU communication 100, the AP 102 transmits multiple space-time streams using multiple antennas (e.g. four antennas as shown in FIG. 1A) with all the space-time streams directed to a single communication apparatus, i.e. the STA 104. For the sake of simplicity, the multiple space-time streams directed to the STA 104 are illustrated as a grouped data transmission arrow 108 directed to the STA 104.

The SU communication 100 can be configured for bi-directional transmissions. As shown in FIG. 1A, in the SU communication 100, the STA 104 may transmit multiple space-time streams using multiple antennas (e.g. two antennas as shown in FIG. 1A) with all the space-time streams directed to the AP 102. For the sake of simplicity, the multiple space-time streams directed to the AP 102 are illustrated as a grouped data transmission arrow 110 directed to the AP 102.

As such, the SU communication 100 depicted in FIG. 1A enables both uplink and downlink SU transmissions in a MIMO wireless network.

Figure 1B:
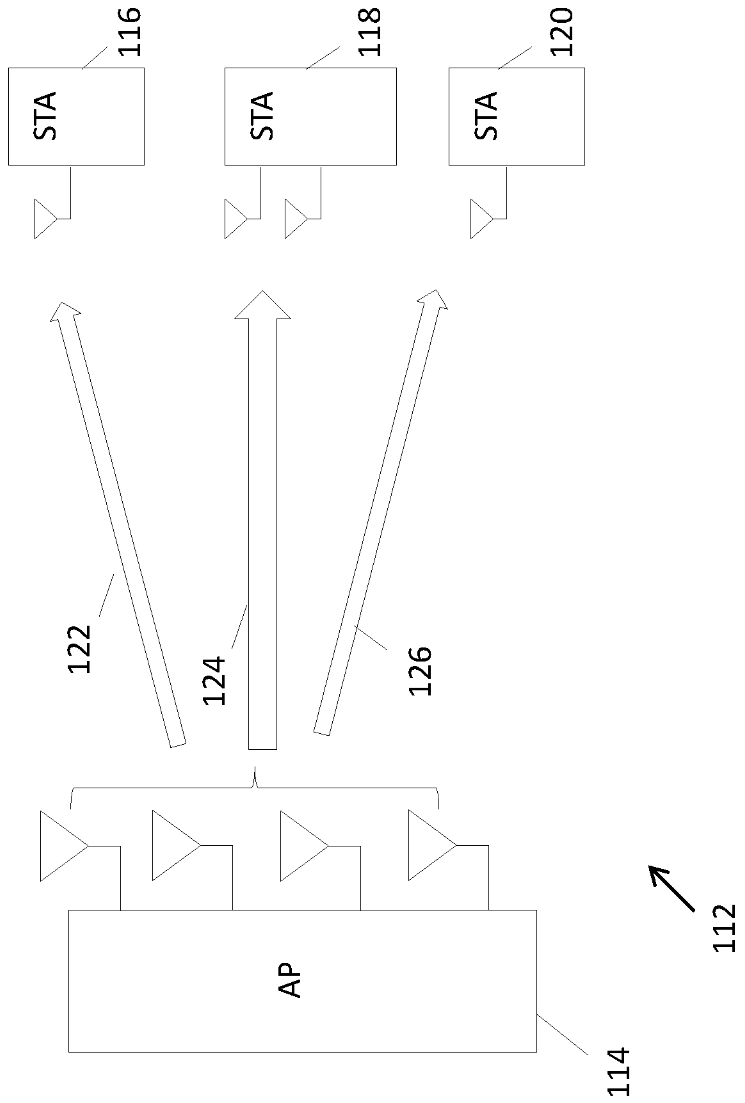
FIG. 1B depicts a schematic diagram of downlink multi-user (MU) communication between an AP and multiple STAs in a MIMO wireless network.
Figure 1C:
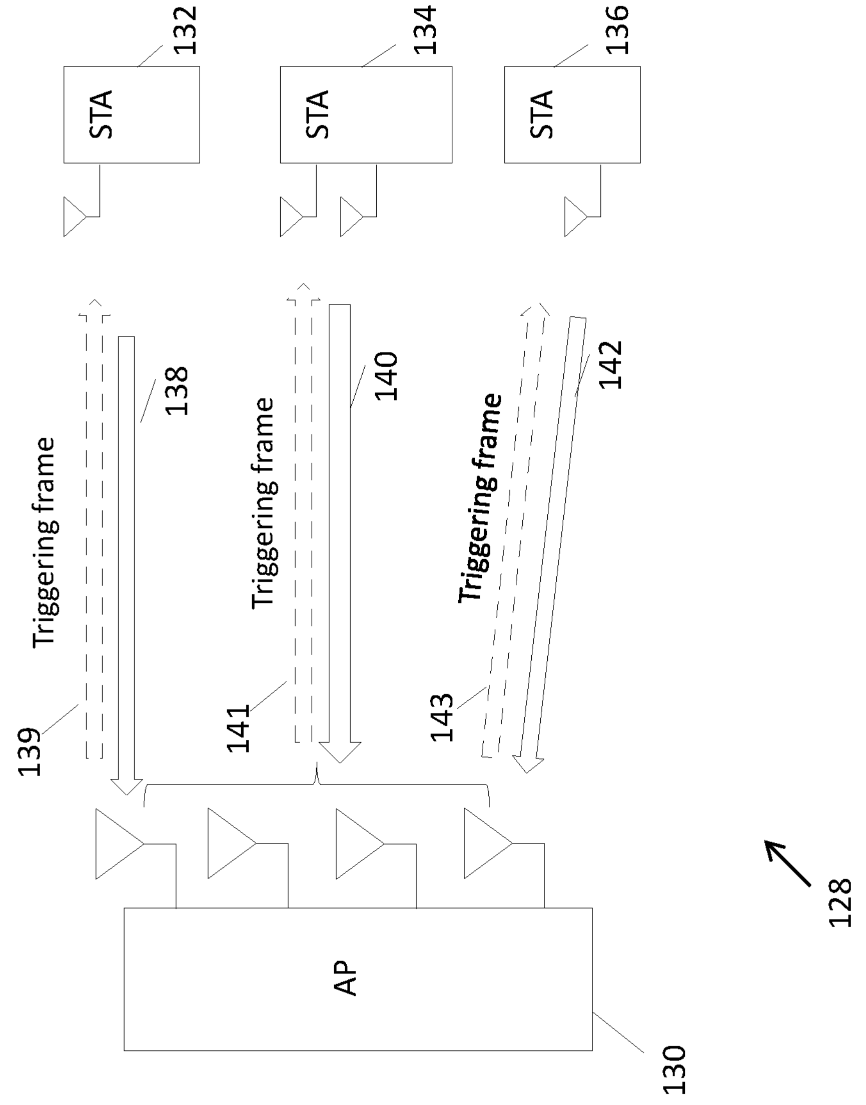
FIG. 1D depicts a schematic diagram of trigger-based downlink multi-AP communication between multiple APs and a STA in a MIMO wireless network.

FIG. 1B depicts a schematic diagram of downlink MU communication 112 between an AP 114 and multiple STAs 116, 118, 120 in a MIMO wireless network. The MIMO wireless network may include one or more STAs (e.g. STA 116, STA 118, STA 120, etc.). The MU communication 112 can be an OFDMA (orthogonal frequency division multiple access) communications or a MU-MIMO communication. For an OFDMA communication in a channel, the AP 114 transmits multiple streams simultaneously to the STAs 116, 118, 120 in the network at different resource units (RUs) within the channel bandwidth. For a MU-MIMO communication in a channel, the AP 114 transmits multiple streams simultaneously to the STAs 116, 118, 120 at same RU(s) within the channel bandwidth using multiple antennas via spatial mapping or precoding techniques. If the RU(s) at which the OFDMA or MU-MIMO communication occurs occupy whole channel bandwidth, the OFDMA or MU-MIMO communications is called full bandwidth OFDMA or MU-MIMO communications. If the RU(s) at which the OFDMA or MU-MIMO communication occurs occupy a part of channel bandwidth (e.g. one or more 20 MHz subchannel within the channel is punctured), the OFDMA or MU-MIMO communication is called punctured OFDMA or MU-MIMO communications. For example, two space-time streams may be directed to the STA 118, another space-time stream may be directed to the STA 116, and yet another space-time stream may be directed to the STA 120. For the sake of simplicity, the two space-time streams directed to the STA 118 are illustrated as a grouped data transmission arrow 124, the space-time stream directed to the STA 116 is illustrated as a data transmission arrow 122, and the space-time stream directed to the STA 120 is illustrated as a data transmission arrow 126.

To enable uplink MU transmissions, trigger-based communication is provided to the MIMO wireless network. In this regard, FIG. 10 depicts a schematic diagram of trigger-based uplink MU communication 128 between an AP 130 and multiple STAs 132, 134, 136 in a MIMO wireless network.

Since there are multiple STAs 132, 134, 136 participating in the trigger-based uplink MU communication, the AP 130 needs to coordinate simultaneous transmissions of multiple STAs 132, 134, 136.

Figure 10:
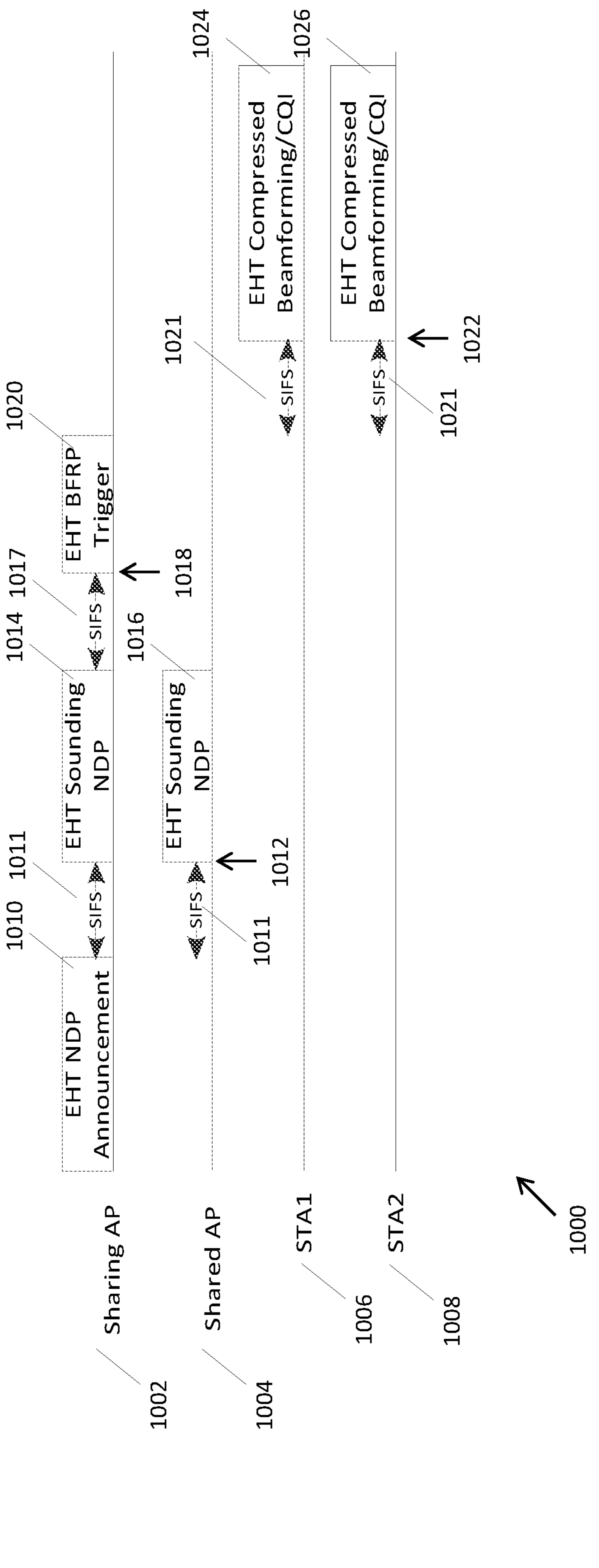
FIG. 10 depicts a schematic diagram of trigger-based uplink MU communication between an AP and multiple STAs in a MIMO wireless network.

To do so, as shown in FIG. 10, the AP 130 transmits triggering frames 139, 141, 143 simultaneously to STAs 132, 134, 136 to indicate user-specific resource allocation information (e.g. the number of space-time streams, a starting STS number and the allocated RUs) each STA can use. In response to the triggering frames, STAs 132, 134, 136 may then transmit their respective space-time streams simultaneously to the AP 130 according to the user-specific resource allocation information indicated in the triggering frames 139, 141, 143. For example, two space-time streams may be directed to the AP 130 from STA 134, another space-time stream may be directed to the AP 130 from STA 132, and yet another space-time stream may be directed to the AP 130 from STA 136. For the sake of simplicity, the two space-time streams directed to the AP 130 from STA 134 are illustrated as a grouped data transmission arrow 140, the space-time stream directed to the AP 130 from STA 132 is illustrated as a data transmission arrow 138, and the space-time stream directed to the AP 130 from STA 136 is illustrated as a data transmission arrow 142.

Trigger-based communication is also provided to the MIMO wireless network to enable downlink multi-AP communication. In this regard, FIG. 1D depicts a schematic diagram of downlink multi-AP communication 144, between a STA 150 and multiple APs 146, 148 in a MIMO wireless network.

Since there are multiple APs 146, 148 participating in the trigger-based downlink multi-AP MIMO communication, the master AP 146 needs to coordinate simultaneous transmissions of multiple APs 146, 148.

Figure 1D:
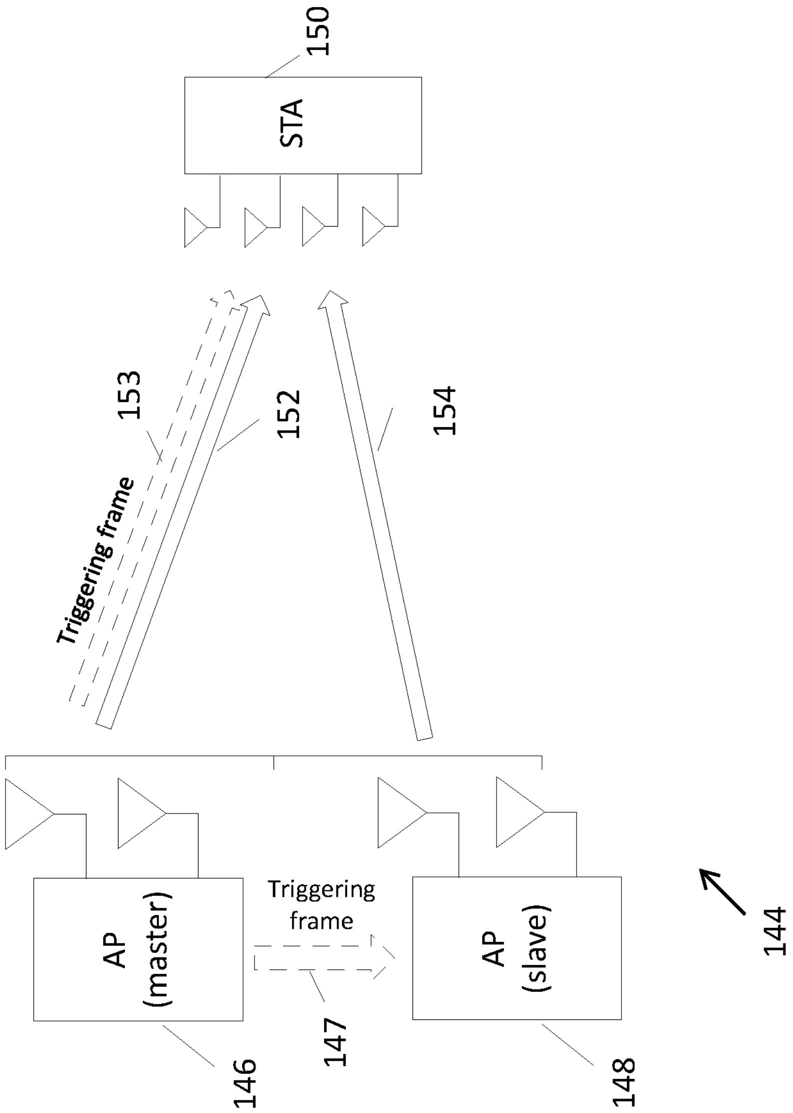

To do so, as shown in FIG. 1D, the master AP 146 transmits triggering frames 147, 153 simultaneously to the AP 148 and the STA 150 to indicate AP-specific resource allocation information (e.g. the number of space-time streams, a starting STS stream number and the allocated RUs) each AP can use. In response to the triggering frames, the multiple APs 146, 148 may then transmit respective space-time streams to the STA 150 according to the AP-specific resource allocation information indicated in the triggering frame 147; and the STA 150 may then receive all the space-time streams according to the AP-specific resource allocation information indicated in the triggering frame 153. For example, two space-time streams may be directed to the STA 150 from AP 146, and another two space-time streams may be directed to the STA 150 from AP 148. For the sake of simplicity, the two space-time streams directed to the STA 150 from AP 146 are illustrated as a grouped data transmission arrow 152, and the two space-time streams directed to the STA 150 from the AP 148 is illustrated as a grouped data transmission arrow 154.

Due to packet/PPDU (physical layer protocol data unit) based transmission and distributed MAC (medium access control) scheme in 802.11 WLAN, time scheduling (e.g. TDMA (time division multiple access)-like periodic time slot assignment for data transmission) does not exist in 802.11 WLAN. Frequency and spatial resource scheduling is performed on a packet basis. In other words, resource allocation information is on a PPDU basis.

According to various embodiments, EHT WLAN supports non-trigger-based communications as illustrated in FIG. 1A and FIG. 1B and trigger-based communications as illustrated in FIG. 10 and FIG. 1D. In non-trigger-based communications, a communication apparatus transmits a PPDU to one other communication apparatus or more than one other communication apparatuses in an unsolicited manner. In trigger-based communications, a communication apparatus transmits a PPDU to one other communication apparatus or more than one other communication apparatuses only after a soliciting triggering frame is received.

Figure 2A:
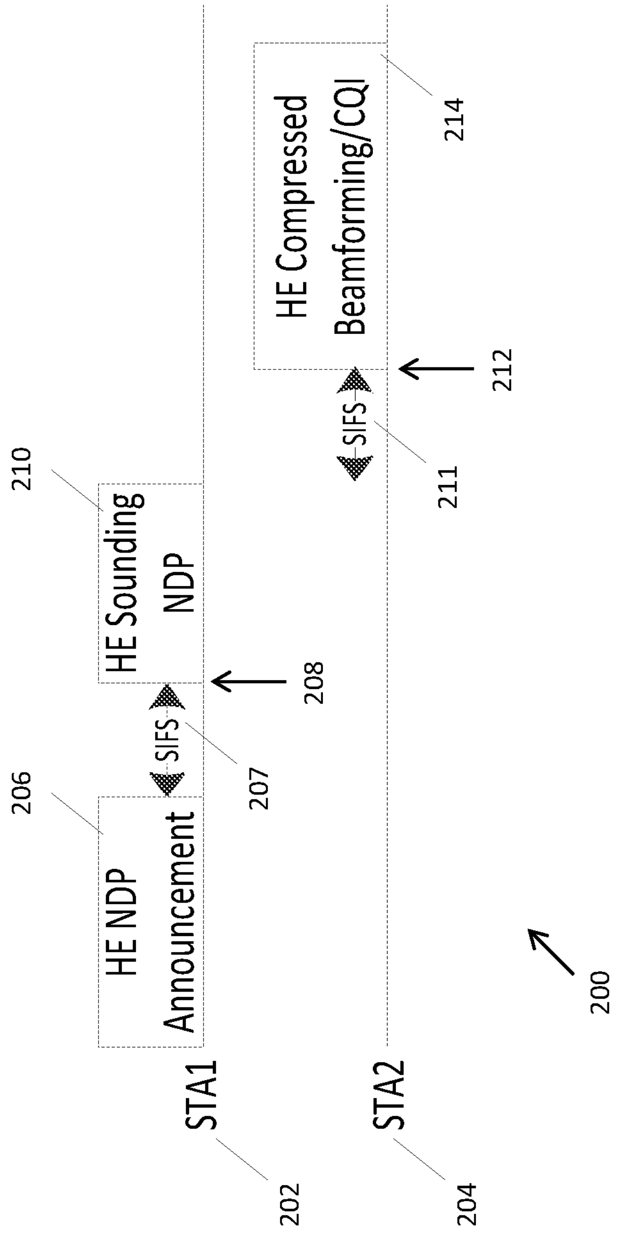
FIG. 2A depicts a single-AP based sounding procedure between two STAs in an 11ax HE WLAN.

FIG. 2A depicts a single-AP based sounding procedure 200 between two STAs 202, 204 in an 11ax HE WLAN. The single-AP based sounding procedure 200 may start when the STA1 202, e.g. an AP, generates a HE NDP (null data packet) Announcement frame 206 to an intended STA, e.g. STA2 204. The HE NDP Announcement frame 206 comprises requested sounding feedback parameters per STA such as feedback bandwidth, feedback type, subcarrier grouping, quantization resolution and number of columns of compressed beamforming feedback matrix. The feedback type is one of SU feedback, MU feedback and CQI (channel quality indicator) feedback. When the feedback type is SU feedback or MU feedback, the requested sounding feedback information comprises compressed beamforming feedback information per subcarrier or subcarrier group. When the feedback type is CQI feedback, the requested sounding feedback information comprises CQI information per subcarrier or subcarrier group. In IEEE 802.11 networks, a short interframe spacing (SIFS) is the time spacing prior to transmission of an acknowledgement by a STA. Upon transmission of the HE NDP Announcement frame 206, a SIFS 207 may take effect, and at 208, the STA1 202 may transmit a HE Sounding NDP 210 to the STA2 204. The HE Sounding NDP 210 may comprise a HE Long Training Field (HE-LTF) for CSI (channel state information) estimation.

After the last symbol of the HE Sounding NDP 210 is transmitted, a SIFS 211 may take effect, and at 212, the STA2 204 may transmit a HE Compressed Beamforming/CQI frame 214 comprising sounding feedback information to the STA1 202. In an embodiment, the sounding feedback information may be derived by the STA2 204 from CSI which is estimated from the HE-LTF field of the HE Sounding NDP 210 and be prepared according to its requested sounding feedback parameters indicated in the HE NDP Announcement frame 206. Based on the received sounding feedback information from the STA2 204, the STA1 202 may be able to determine a steering matrix and/or allocate appropriate resource units (RUs) for subsequent transmissions to the STA2 204.

Figure 2B:
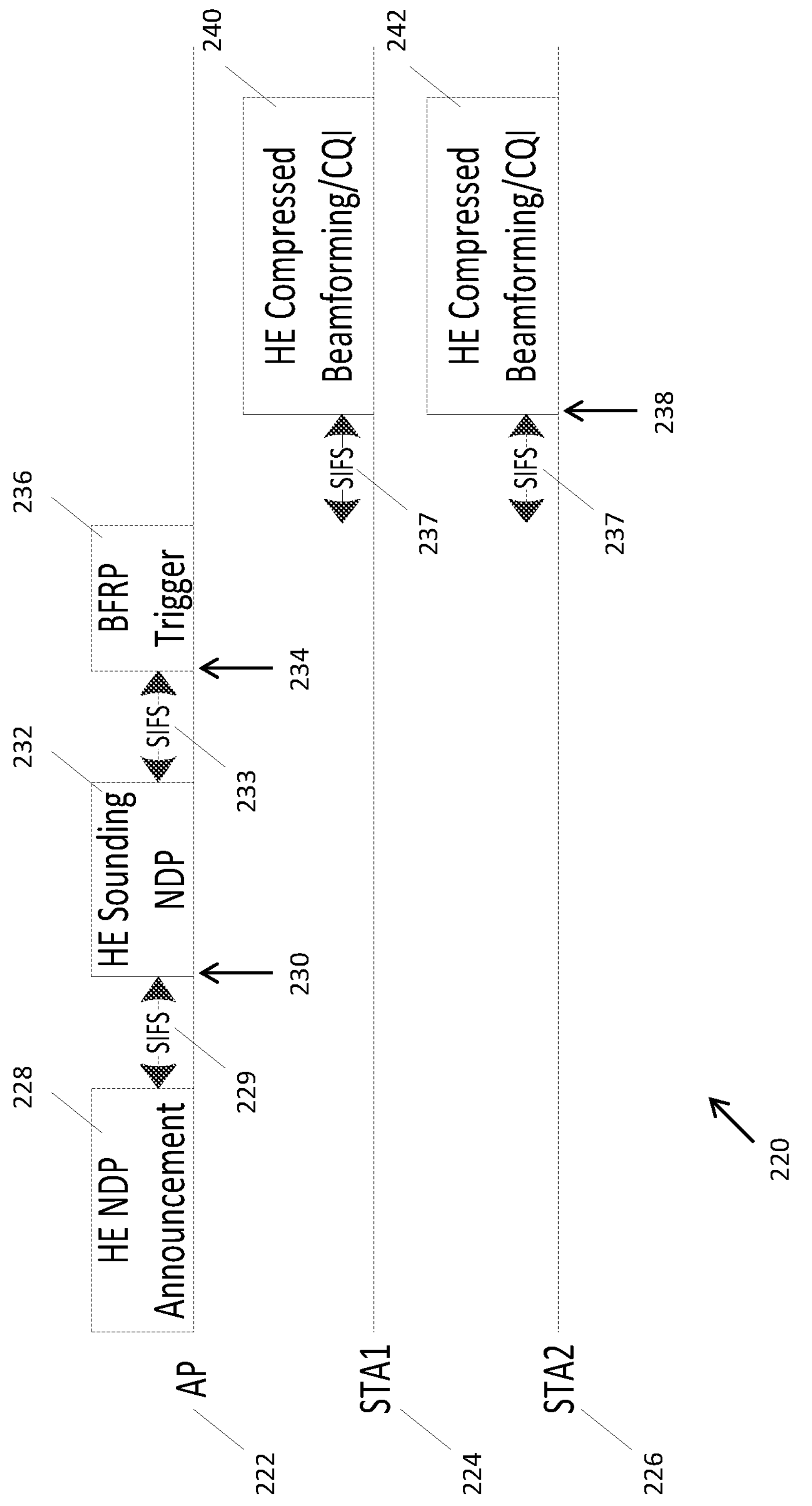
FIG. 2B depicts a single-AP based sounding procedure between an AP and multiple STAs in an 11ax HE WLAN.

FIG. 2B depicts a single-AP based sounding procedure 220 between an AP 222 and multiple STAs 224, 226 in an 11ax HE WLAN. The single-AP based sounding procedure 220 may start when the AP 222 generates an HE NDP Announcement frame 228 to intended STAs such as STA1 224 and STA2 226. The HE NDP Announcement frame 228 comprises requested sounding feedback parameters per STA such as feedback bandwidth, feedback type, subcarrier grouping, quantization resolution and number of columns of compressed beamforming feedback matrix. The feedback type is one of SU feedback, MU feedback and CQI feedback. When the feedback type is SU feedback or MU feedback, the requested sounding feedback information comprises compressed beamforming feedback information per subcarrier or subcarrier group. When the feedback type is CQI feedback, the requested sounding feedback information comprises CQI information per subcarrier or subcarrier group. Upon transmission of the HE NDP Announcement frame 228, a SIFS 229 may take effect, and at 230, the AP 222 may transmit a HE Sounding NDP 232 to the STA1 224 and STA2 226.

After the HE Sounding NDP 232 is transmitted, a SIFS 233 may take effect, and at 234, the AP 222 may transmit a Beamforming Report Poll (BFRP) Trigger frame 236 to solicit simultaneous transmissions of sounding feedback information from the STA1 224 and STA2 226.

After the last symbol of the BFRP Trigger frame 236 is transmitted, a SIFS 237 may take effect, and at 238, the STA1 224 and STA2 226 may simultaneously transmit respective HE Compressed Beamforming/CQI frames 240, 242 comprising respective sounding feedback information to the AP 222. In an embodiment, the sounding feedback information may be derived by the STA1 224 and STA2 226 from respective CSIs which are estimated from the HE-LTF field of the HE Sounding NDP 232 and be prepared according to respective sounding feedback parameters indicated in the HE NDP Announcement frame 228. Based on the received sounding feedback information from the STA1 224 and STA2 226, the AP 222 may be able to determine a steering matrix and/or allocate appropriate RUs for each of the STA1 224 and STA2 226 for subsequent transmissions to the STA1 224 and/or STA2 226.

It is noted that in 11ax HE WLAN, AP and STA(s) engaged in a single-AP based sounding procedure belong to a single BSS (basic service set). Therefore, in order to improve throughput in 11be EHT WLAN over 11ax HE WLAN, it is an object to of present disclosure to substantially overcome the existing challenges to provide communication apparatuses and methods for channel sounding that enable multi-AP coordination in a multi-AP system.

According to the present disclosure, a multi-AP coordination setup procedure is carried out among APs for multi-AP coordination candidate set formation. A multi-AP coordination candidate set comprises a sharing AP and one or more shared APs. In a multi-AP coordination setup, a AP set identifier (ID) is assigned to a multi-AP coordination candidate set, where each AP in the multi-AP coordination candidate set may be assigned with a AP ID, which together with the AP set ID, is used to uniquely identify a specific AP in the multi-AP coordination candidate set. In an embodiment, in a multi-AP coordination setup, capability negotiation among APs in a multi-AP coordination candidate set may be performed. Alternatively, capability negotiation among APs in a multi-AP coordination candidate set may be performed prior to a multi-AP coordination setup procedure, for example using backhaul. In an embodiment, in a multi-AP coordination setup, intended STAs may indicate preferable APs in a multi-AP coordination candidate set for multi-AP coordination operation.

After a multi-AP coordination setup procedure is completed, each AP in a multi-AP coordination candidate set may indicate multi-AP coordination related information such as multi-AP coordination candidate set information, AP's capabilities including AP sounding capabilities and multi-AP coordination capabilities, etc. in Beacon frame or the like.

In various embodiments, prior to starting a sounding procedure for multi-AP operation, sharing AP in a multi-AP coordination candidate set may initiate a sounding setup procedure with each of shared AP(s) in the multi-AP coordination candidate set to make necessary preparations for the sounding procedure.

Figure 3A:
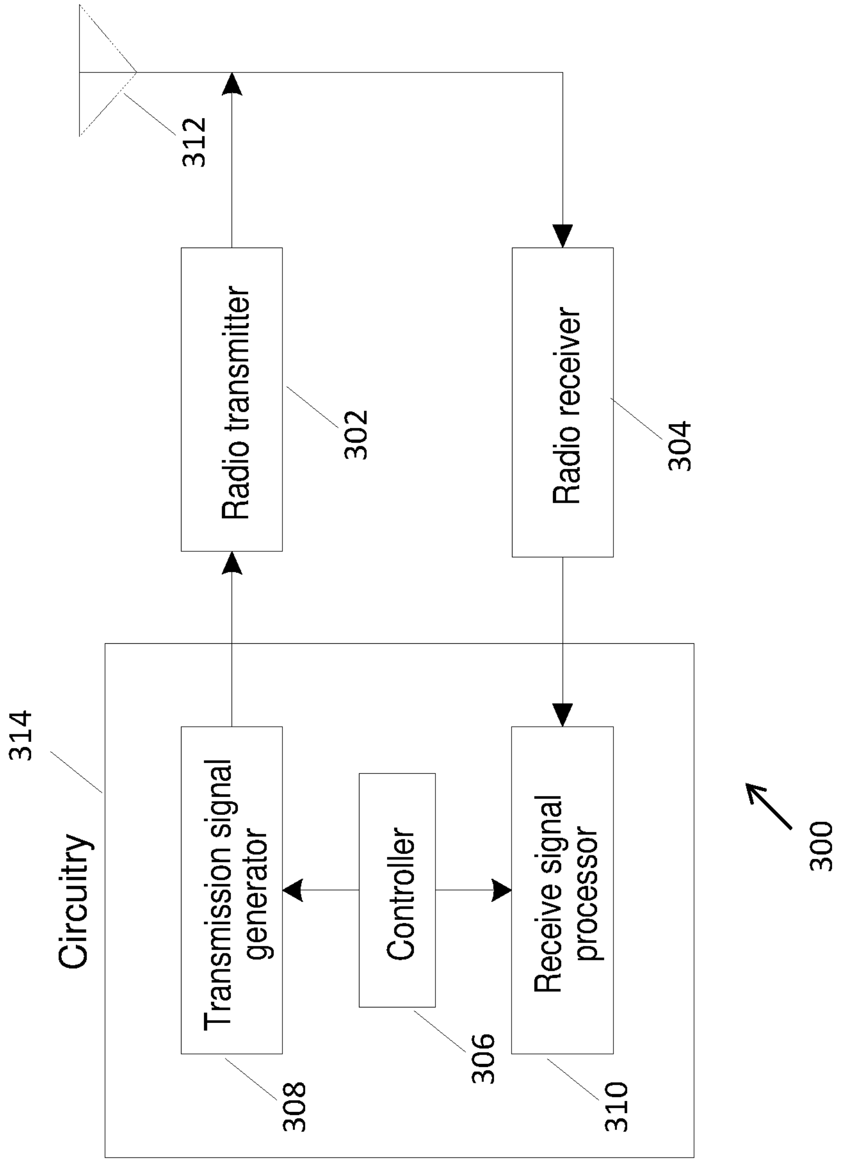
FIG. 3A shows a schematic example of communication apparatus in accordance with various embodiments. The communication apparatus may be implemented as an AP or a STA and configured for channel sounding in accordance with the present disclosure.

FIG. 3A shows a schematic, partially sectioned view of a communication apparatus 300 according to the present disclosure. The communication apparatus 300 may also be implemented as an AP or a STA.

As shown in FIG. 3A, the communication apparatus 300 may include circuitry 314, at least one radio transmitter 302, at least one radio receiver 304, and at least one antenna 312 (for the sake of simplicity, only one antenna is depicted in FIG. 3A for illustration purposes). The circuitry 314 may include at least one controller 306 for use in software and hardware aided execution of tasks that the at least one controller 306 is designed to perform, including control of communications with one or more other communication apparatuses in a MIMO wireless network. The circuitry 314 may furthermore include at least one transmission signal generator 308 and at least one receive signal processor 310. The at least one controller 306 may control the at least one transmission signal generator 308 for generating MAC frames (for example EHT Action frames) and PPDUs (for example PPDUs used for non-trigger-based communications or PPDUs used for trigger-based multi-AP joint transmission if the communication apparatus 300 is an AP, and for example PPDUs used for non-trigger-based communications or PPDUs used for trigger-based uplink transmissions if the communication apparatus 300 is a STA) to be sent through the at least one radio transmitter 302 to one or more other communication apparatuses and the at least one receive signal processor 310 for processing MAC frames (for example EHT Action frames) and PPDUs (for example PPDUs used for non-trigger-based communications or PPDUs used for trigger-based uplink transmissions if the communication apparatus 300 is an AP, and for example PPDUs used for non-trigger-based communications or PPDUs used for trigger-based multi-AP joint transmission if the communication apparatus 300 is a STA) received through the at least one radio receiver 304 from the one or more other communication apparatuses under the control of the at least one controller 306. The at least one transmission signal generator 308 and the at least one receive signal processor 310 may be stand-alone modules of the communication apparatus 300 that communicate with the at least one controller 306 for the above-mentioned functions, as shown in FIG. 3A. Alternatively, the at least one transmission signal generator 308 and the at least one receive signal processor 310 may be included in the at least one controller 306. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 302, at least one radio receiver 304, and at least one antenna 312 may be controlled by the at least one controller 306.

The communication apparatus 300, when in operation, provides functions required for single-AP or multi-AP based channel sounding. For example, the communication apparatus 300 may be an AP (for example a sharing AP), and the circuitry 314 (for example the at least one transmission signal generator 308 of the circuitry 314) may, in operation, generate a first frame (for example Sounding Setup Request frame) comprising a first field which indicates an intended usage of a sounding procedure. The radio transmitter 302 may in operation, transmit the first frame to each of one or more peer communication apparatuses (for example shared APs). In an embodiment, the radio receiver 304 may in operation, receive a second frame (for example Sounding Setup Response frame) from the each of the one or more peer communication apparatuses, the second frame comprising a first field which indicates one or more recommended type of the sounding procedure. In another embodiment, the circuitry 314 (for example the at least one transmission signal generator 308 of the circuitry 314) may, in operation, further generate a third frame (for example EHT NDP Announcement frame) which starts the sounding procedure.

The communication apparatus 300 may be a peer AP (for example a shared AP), and the radio receiver 304 may, in operation, receive a first frame (for example Sounding Setup Request frame) from one other communication apparatus (e.g. a sharing AP) comprising a first field which indicates an intended usage of a sounding procedure. The circuitry 314 (for example the at least one receive signal processor 310 of the circuitry 314) may, in operation, process the first frame. In an embodiment, the radio transmitter 302 may in operation, transmit a second frame (for example Sounding Setup Response frame) to the one other communication apparatus, the second frame comprising a first field which indicates one or more recommended type of the sounding procedure.

Figure 3B:
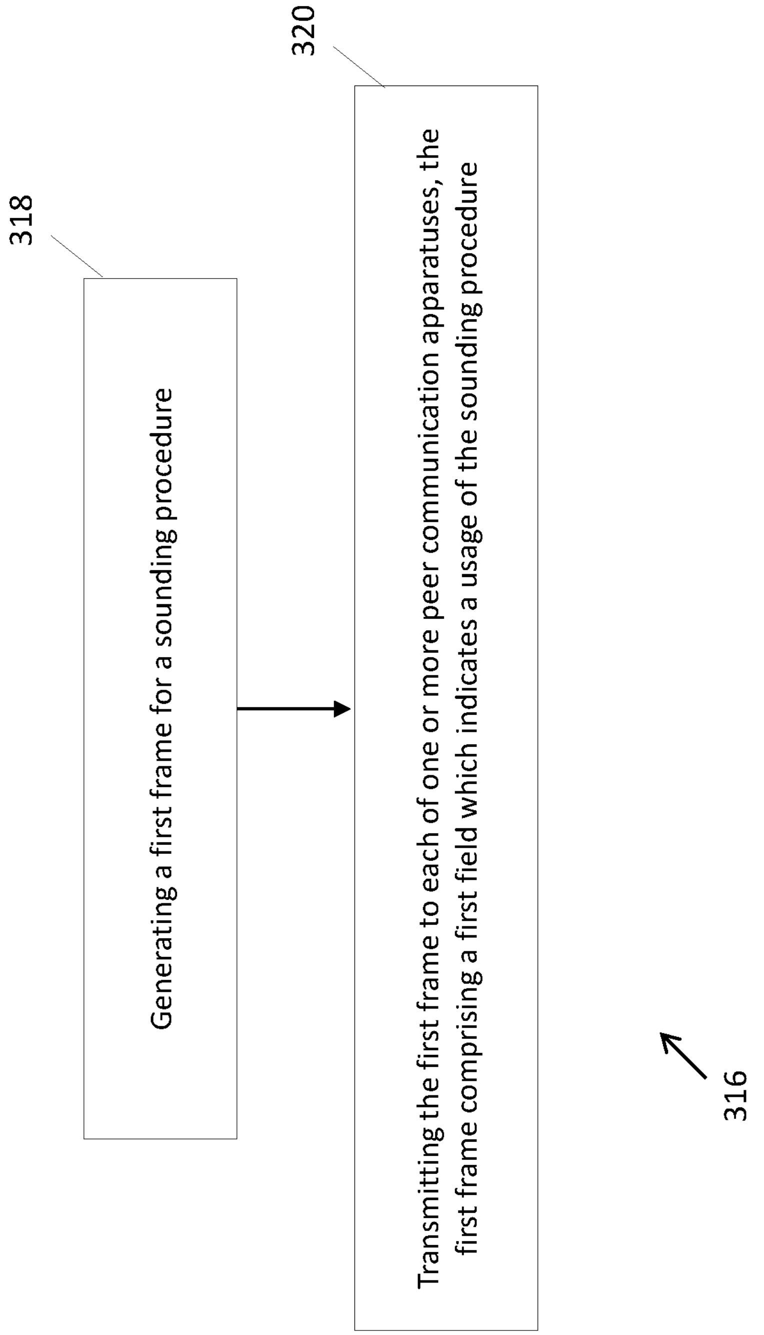
FIG. 3B shows a flow diagram illustrating a communication method according to the present disclosure.

FIG. 3B shows a flow diagram illustrating a communication method according to the present disclosure. In step 318, a step of generating a first frame for a sounding procedure is carried out. In step 320, a step of transmitting the first frame to each of one or more peer communication apparatuses is carried out, wherein the first frame comprising a first field which indicates an intended usage of the sounding procedure.

In an embodiment, the first frame may comprise a second field which indicates an intended type of the sounding procedure. In another embodiment, the first frame may comprise a third field which indicates one or more intended communication apparatuses (for example STAs) which will be engaged in the sounding procedure.

Figure 4:
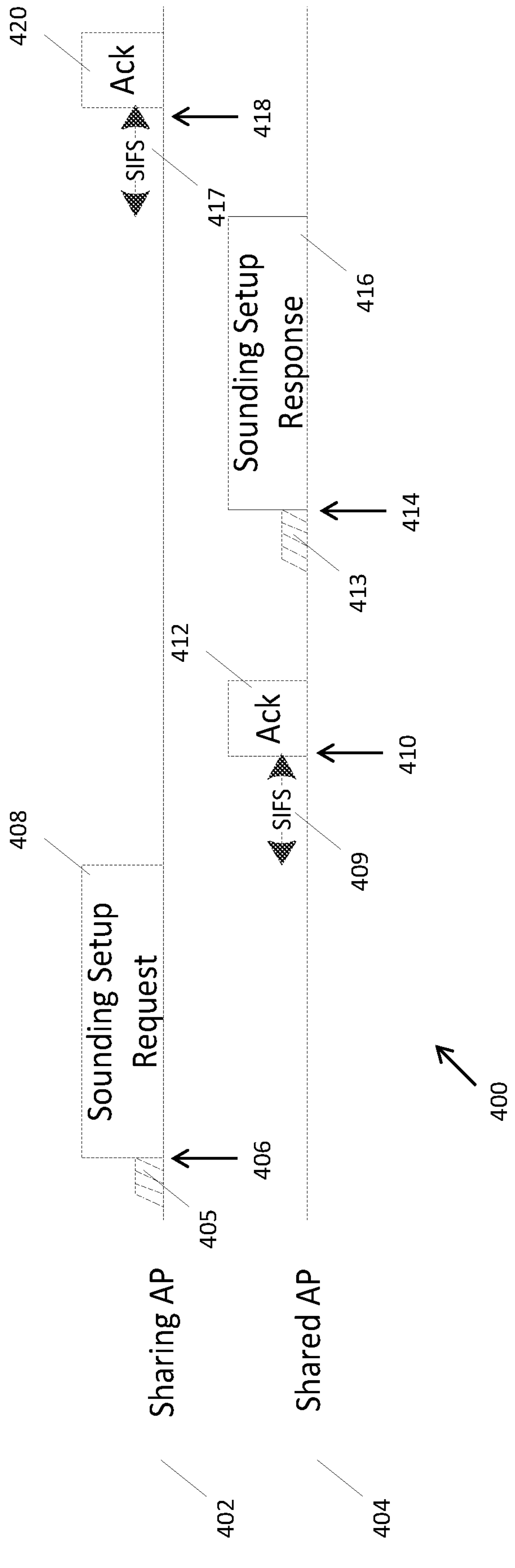
FIG. 4 depicts a flow chart illustrating a sounding setup procedure according to an embodiment.

FIG. 4 depicts a flow chart illustrating a sounding setup procedure 400 between two APs, specifically between a sharing AP 402 and a shared AP 404, according to the present disclosure. Contention based channel access procedures, e.g. enhanced distributed channel access (EDCA) procedures, is illustrated by blocks 405, 413, and SIFS 409, 417 are illustrated. A sounding setup procedure includes Sounding Setup Request and Response frames exchanged between sharing AP and each of shared AP(s) in a multi-AP coordination candidate set. A Sounding Setup Request or Response frame is an EHT Action frame. In particular, the sharing AP 402 may generate a first frame 408, for example EHT Action frame comprising a sounding setup request (hereinafter referred as "Sounding Setup Request frame") to initiate the sounding setup procedure 400. The radio transmitter of the sharing AP 402 may transmit the Sounding Setup Request frame 408 to the shared AP 404.

Upon reception of the Sounding Setup Request frame 408, a SIFS 409 may take effect, and at 410, the shared AP 404 may transmit an Acknowledgement (Ack) frame 412 to the sharing AP 402 to indicate a successful receipt of the Sounding Setup Request frame 408.

After the last symbol of the Ack frame 412 is transmitted, the shared AP 404 may generate a second frame 416, for example an EHT Action frame comprising a sounding setup response (hereinafter referred as "Sounding Setup Request frame") to respond to the Sounding Setup Request frame 408 and indicate whether the shared AP 404 has been ready for a subsequent sounding procedure.

Upon reception of the Sounding Setup Response frame 416, a SIFS 417 may take effect, and at 418, the sharing AP 402 may transmit an Ack frame 420 to the shared AP 404 to indicate a successful receipt of the Sounding Setup Response frame 416.

Figure 5A:
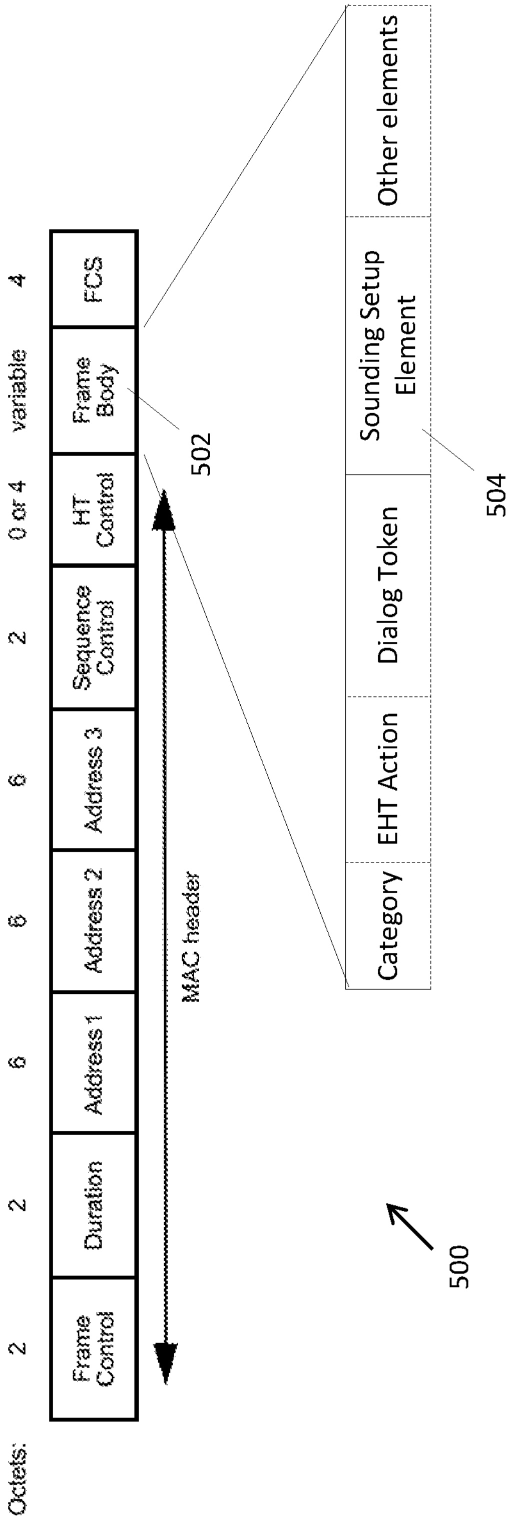
FIG. 5A depicts an example format of an EHT Action frame.

FIG. 5A depicts an example format of an EHT Action frame 500, which may be used as Sounding Setup Request frame 408 or Sounding Setup Response frame 416 as illustrated in FIG. 4. The EHT Action frame 500 may include (or consist of) a Frame Control field, a Duration field, three Address fields (Address 1, 2 and 3 respectively) a Sequence Control field, a HT (high throughput) Control field, a Frame Body field 502 and a FCS (frame check sequence) field. The Frame Control field, a Duration field, the three Address fields (Address 1, 2 and 3 respectively) the Sequence Control field, the HT Control field may be grouped as MAC header. The Frame Body field 502 may further include a Category field, an EHT Action field, a Dialog Token field, a Sounding Setup Element field 504 and other elements or fields.

Figure 5B:
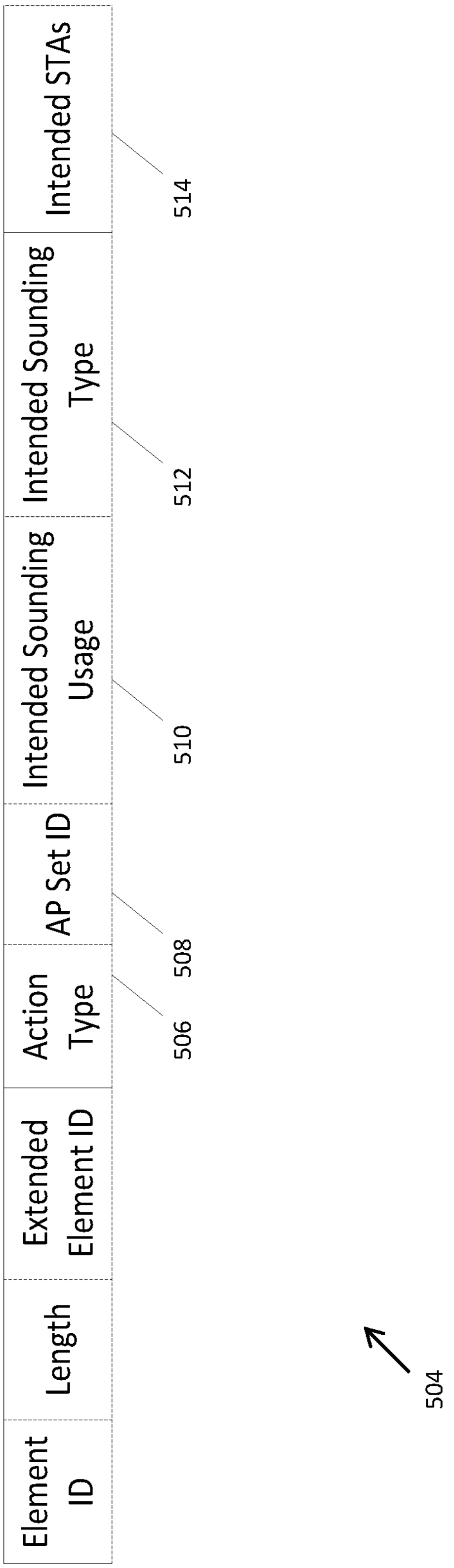
FIG. 5B depicts an example format of the Sounding Setup Element field of the EHT Action frame.

FIG. 5B depicts an example format of the Sounding Setup Element field 504 of the EHT Action frame 500 when the Action Type field 506 refers to "Request" indicating a Sounding Setup Request frame. The Sounding Setup Element field 504 may include (or consist of) an Element ID field, a Length field, an Extended Element ID field, an Action Type field 506, an AP Set ID field 508. When the Action Type field 506 refers to "Request", the Sounding Setup Element field 502 may further include an Intended Sounding Usage field 510, an Intended Sounding Type field 512 and an Intended STAs field 514. The AP Set ID field 508 identifies a multi-AP coordination candidate set including sharing AP and at least one shared AP. The Intended STAs field 514 indicate one or more STAs which belong to BSS of the sharing AP and/or BSS of the at least one shared AP and are supposed to be engaged in the following sounding procedure. It is noted that in 11be EHT WLAN, AP(s) and STA(s) engaged in a single-AP or multi-AP based sounding procedure may belong to different BSSs. In 11be EHT WLAN, an STA can be identified by BSSID (BSS identifier) of an AP with which the STA is associated and its STA ID. Alternatively, AP ID of an AP with which an STA is associated, together with AP set ID of a multi-AP coordination candidate set including the AP and STA ID of the STA, can identify the STA. Further details of the Intended Sounding Usage field 510 and the Intended Sounding Type field 512 will be elaborated in the following.

Figure 5C:
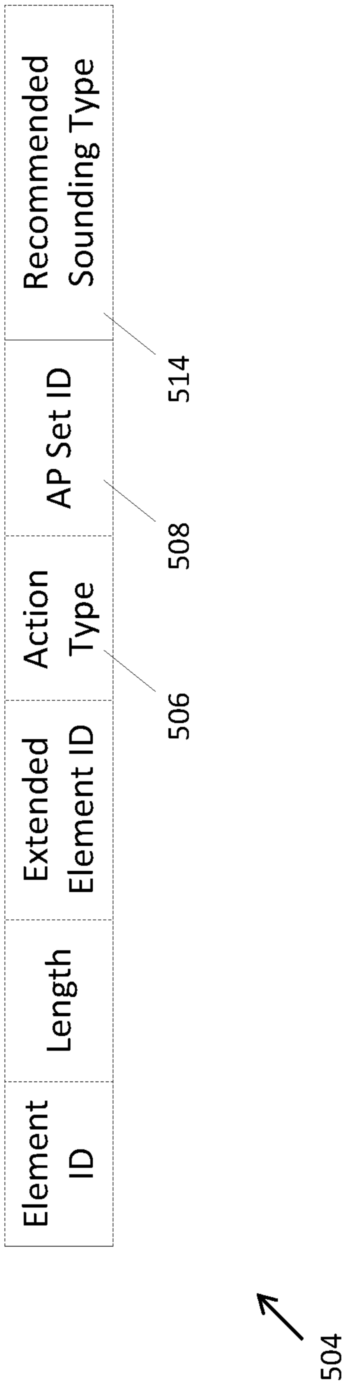
FIG. 5C depicts another example format of the Sounding Setup Element field of the EHT Action frame.

FIG. 5C depicts another example format of the Sounding Setup Element field 504 for the EHT Action frame 500 when the Action Type field 506 refers to "Response" indicating a Sound Setup Response frame. Similarly, the Sounding Setup Element field 504 may include (or consist of) an Element ID field, a Length field, an Extended Element ID field, an Action Type field 506 and an AP Set ID field 508. When the Action Type field refers to "Response", the Sounding Setup Element field 504 may further include a Recommended Sounding Type field 514 to indicate one or more recommended type of the sounding procedure. Further details of the Recommended Sounding Type field 514 will be elaborated in the following.

The sharing AP 402 may determine intended sounding parameters such as intended sounding usage and intended sounding type based on capability negotiation among APs in a multi-AP coordination candidate set which is performed prior to a sounding setup procedure.

The Intended Sounding Usage field 510 indicates an intended usage of a sounding procedure following the sounding setup procedure (i.e. an intended scheme of multi-AP coordination that utilizes results of the sounding procedure). An intended scheme of multi-AP coordination is one of the following:

- Coordinated spatial reuse
- Coordinated orthogonal frequency-division multiple access (OFDMA)
- Coordinated beamforming; and
- Joint beamforming (also known as joint transmission)

The Intended Sounding Type field 512 indicates an intended type of a sounding procedure following the sounding setup procedure, which is one of the following:

- Single-AP based explicit sounding;
- Single-AP based implicit sequential sounding;
- Single-AP based implicit joint sounding;
- Multi-AP based explicit sequential sounding;
- Multi-AP based explicit joint sounding;
- Multi-AP based implicit sequential sounding;
- Multi-AP based implicit joint sounding;
- Multi-AP based hybrid sequential sounding; and
- Multi-AP based hybrid joint sounding Further, in the Sounding Setup Response frame 416, the Recommended Sounding Type field 514 indicates one or more recommended type of a sounding procedure following the sounding setup procedure, which is one of the following:

- Single-AP based explicit sounding;
- Single-AP based implicit sequential sounding;
- Single-AP based implicit joint sounding;
- Multi-AP based explicit sequential sounding;
- Multi-AP based explicit joint sounding;
- Multi-AP based implicit sequential sounding;
- Multi-AP based implicit joint sounding; and
- Exemption from multi-AP based sounding is requested.

It is noted that the shared AP 404 should take into account the intended scheme of multi-AP coordination when the shared AP 404 makes any recommendation on the sounding type in the Recommended Sounding Type field 514. For one example, results of multi-AP based sequential sounding cannot be used for joint beamforming. For another example, results of single-AP based sounding may be used for coordinated spatial reuse and coordinated OFDMA but cannot be used for coordinated beamforming and joint beamforming.

After receiving a Sounding Setup Request frame 408 from the sharing AP 402, the shared AP 404 may determine if its transmit and receive (TX/RX) chains need to be reconfigured for the following sounding procedure according to the information on intended STA(s) indicated in the Sounding Setup Request frame 408.

According to an embodiment of the present disclosure, when the shared AP 404 is not able to get ready for the intended sounding type indicated in the Sounding Setup Request frame 408, the shared AP 404 may recommend one or more different sounding type or request to be exempted from following sounding procedure in the Sounding Setup Response frame 416.

According to another embodiment of the present disclosure, when the shared AP 404 supports single-AP based implicit sounding or multi-AP based implicit sounding and its TX/RX chains are reconfigured for the following sounding procedure, a calibration procedure may be initiated by the shared AP 404 to recalibrate its TX/RX chains before it sends the Sounding Setup Response frame 416 to the sharing AP 402. However, if the calibration procedure is not successfully completed, the shared AP 404 may not recommend any single-AP based or multi-AP based implicit sounding procedure.

A sounding procedure may start after the sounding setup procedure between sharing AP and each of shared AP(s) in a multi-AP coordination candidate set is completed. A sounding procedure may start with transmission of an EHT NDP Announcement frame, which indicates one of the following types of the sounding procedure:

- Single-AP based explicit sounding;
- Single-AP based implicit sequential sounding;
- Single-AP based implicit joint sounding;
- Multi-AP based explicit sequential sounding;
- Multi-AP based explicit joint sounding;
- Multi-AP based implicit sequential sounding;
- Multi-AP based implicit joint sounding;
- Multi-AP based hybrid sequential sounding; and
- Multi-AP based hybrid joint sounding.

The EHT NDP Announcement frame starting a multi-AP based sounding procedure may be transmitted by sharing AP.

Figure 6A:
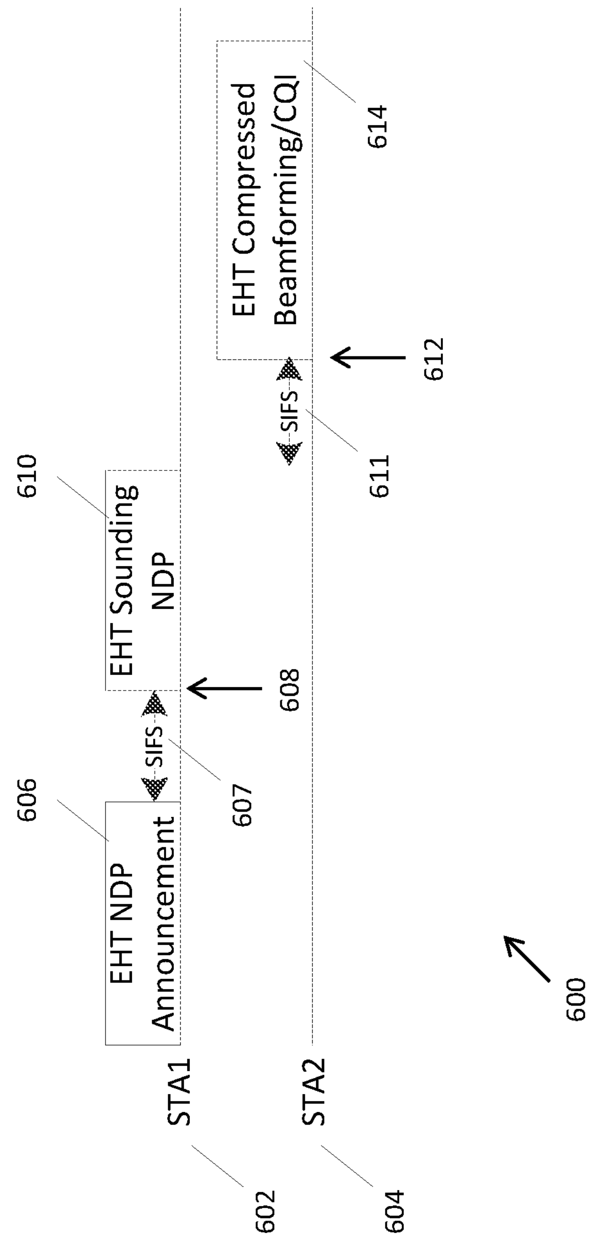
FIG. 6A depicts a flow chart illustrating single-AP based explicit sounding procedure between two STAs in an 11be EHT WLAN according to an embodiment.

FIG. 6A depicts a flow chart illustrating a single-AP based explicit sounding procedure 600 between two STAs 602, 604 in an 11be EHT WLAN according to an embodiment. The Single-AP based explicit sounding procedure 600 may start when STA1 602, e.g. an AP, transmits an EHT NDP Announcement frame 606 to an intended STA, such as STA2 604. The EHT NDP Announcement frame 606 comprises requested sounding feedback parameters per STA such as feedback bandwidth, feedback type, subcarrier grouping, quantization resolution and number of columns of compressed beamforming feedback matrix. The feedback type is one of SU feedback, MU feedback, CQI feedback and calibration feedback. When the feedback type is SU feedback or MU feedback, the requested sounding feedback information comprises compressed beamforming feedback information per subcarrier or subcarrier group. When the feedback type is CQI feedback, the requested sounding feedback information comprises CQI information per subcarrier or subcarrier group. When the feedback type is calibration feedback, the requested sounding feedback information comprises compressed CSI per subcarrier or subcarrier group. Upon reception of the EHT NDP Announcement frame 606, a SIFS 607 may take effect, and at 608, the STA1 602 may transmit an EHT Sounding NDP 610 to STA2 604. The EHT Sounding NDP 610 may comprise an EHT-LTF field for CSI estimation.

After the last symbol of the EHT Sounding NDP 610 is transmitted, a SIFS 611 may take effect, and at 612, the STA2 604 may transmit an EHT Compressed Beamforming/CQI frame 614 comprising sounding feedback information to the STA1 602. In an embodiment, the sounding feedback information may be derived by the STA2 604 from CSI which is estimated from the EHT-LTF field of the EHT Sounding NDP 610 and be prepared according to its sounding feedback parameters indicated in the EHT NDP Announcement frame 606. Based on the received sounding feedback information from the STA2 604, the STA1 602 may be able to determine a steering matrix and/or allocate appropriate RUs for subsequent transmissions to the STA2 604.

Figure 6B:
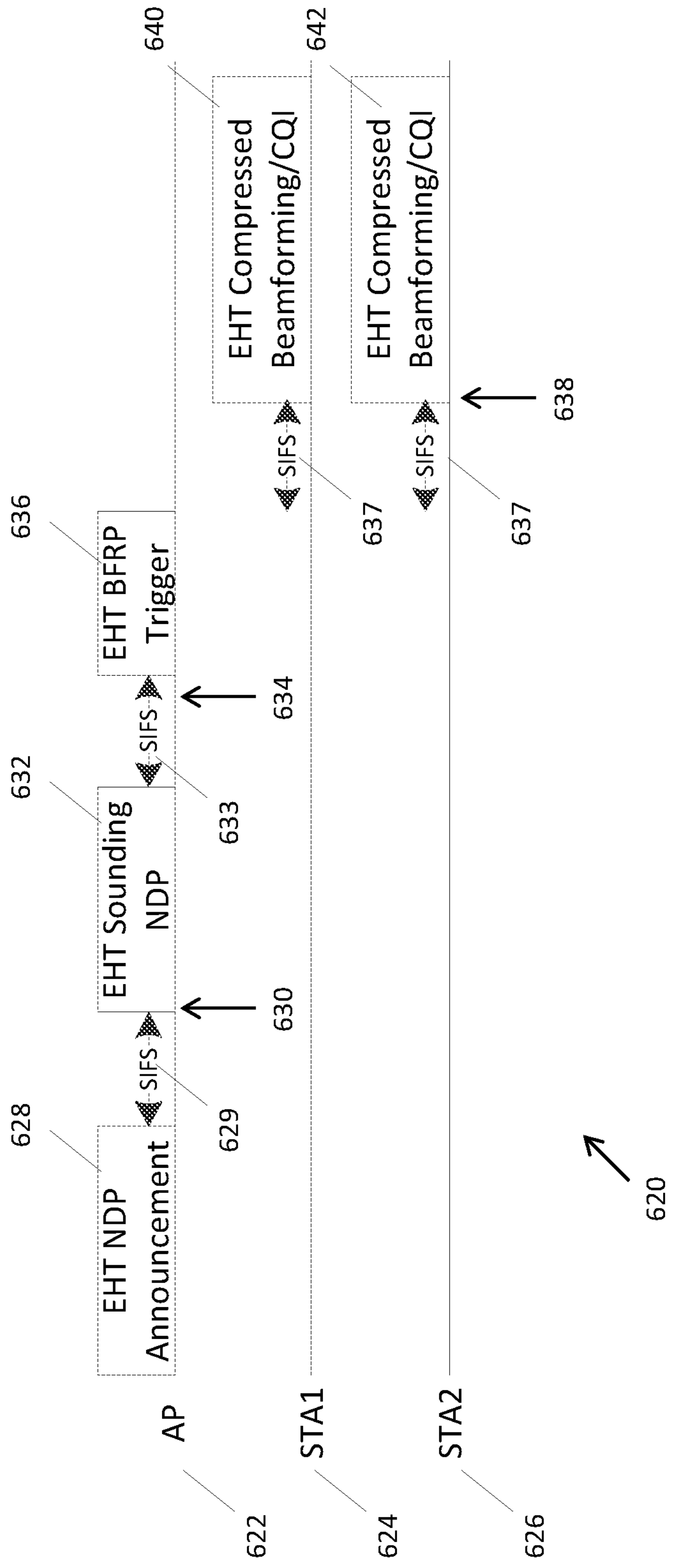
FIG. 6B depicts a flow chart illustrating single-AP based explicit sounding procedure between an AP and multiple STAs in an 11be EHT WLAN according to another embodiment.

FIG. 6B depicts a flow chart illustrating a single-AP based explicit sounding procedure 620 between an AP 622 and multiple STAs 624, 626 in an 11be EHT WLAN according to another embodiment. The single-AP based explicit sounding procedure 620 may start when the AP 622 transmits an EHT NDP Announcement frame 628 to intended STAs such as STA1 624 and STA2 626. Similarly, the EHT NDP Announcement frame 628 may comprise requested sounding feedback parameters per STA such as feedback bandwidth, feedback type, subcarrier grouping, quantization resolution and number of columns of compressed beamforming feedback matrix. The feedback type is one of SU feedback, MU feedback, CQI feedback and calibration feedback. When the feedback type is SU feedback or MU feedback, the requested sounding feedback information comprises compressed beamforming feedback information per subcarrier or subcarrier group. When the feedback type is CQI feedback, the requested sounding feedback information comprises CQI information per subcarrier or subcarrier group. When the feedback type is calibration feedback, the requested sounding feedback information comprises compressed CSI per subcarrier or subcarrier group. Upon transmission of the EHT NDP Announcement frame 628, a SIFS 629 may take effect, and at 630, the AP 622 may transmit an EHT Sounding NDP 632 to the STA1 624 and STA2 626.

After the EHT Sounding NDP 632 is transmitted, a SIFS 633 may take effect, and at 634, the AP 622 may transmit an EHT BFRP Trigger frame 636 to solicit simultaneous transmissions of sounding feedback information from the STA1 624 and STA2 626. After the last symbol of the EHT BFRP Trigger frame 636 is transmitted, a SIFS 637 may take effect, and at 638, the STA1 624 and STA2 626 may simultaneously transmit respective EHT Compressed Beamforming/CQI frames 640, 642 comprising sounding feedback information to the AP 622. In an embodiment, the sounding feedback information may be derived by the STA1 624 and STA2 626 from respective CSIs which are estimated from the EHT-LTF field of the EHT Sounding NDP 632 and be prepared according to respective sounding feedback parameters indicated in the EHT NDP Announcement frame 628. Based on the received sounding feedback information from the STA1 624 and STA2 626, the AP 622 is able to determine a steering matrix and/or allocate appropriate RUs for each of the STA1 624 and STA2 626 for subsequent transmissions to the STA1 624 and/or STA2 626.

According to the present disclosure, when the sounding type indicated in the EHT NDP Announcement frame 606, 628 is single-AP based explicit sounding and the feedback type indicated in the EHT NDP Announcement frame 606, 628 is SU, MU or CQI feedback, the procedure 600, 620 is a normal single-AP based explicit sounding procedure; whereas when the sounding type indicated in the EHT NDP Announcement frame 606, 628 is single-AP based explicit sounding and the feedback type indicated in the EHT NDP Announcement frame 606, 628 is calibration feedback, the procedure 600, 620 is a single-AP based calibration procedure. In other words, single-AP based calibration procedure is a variant of single-AP based explicit sounding procedure as illustrated in FIGS. 6A and 6B. Advantageously, according to the present disclosure, a single procedure 600, 620 can be used for the purpose of both calibration and explicit sounding.

In various embodiments, when the procedure 620 is a single-AP based calibration procedure, the EHT NDP Announcement frame 628 may indicate calibration RU allocation and calibration spatial stream (SS) allocation for each of the STA1 624 and STA2 626. In particular, data RU allocation and data SS allocation for each of the STA1 624 and STA2 626 are indicated in the corresponding EHT BFRP Trigger frame 636. Calibration SSs allocated to a STA may include data SSs allocated to the STA. In other words, number of calibration SSs may be equal to or larger than number of data SSs. In addition, calibration RUs allocated to a STA may be the same as data RUs allocated to the STA.

In various embodiments, when the procedure 600, 620 is a single-AP based calibration procedure, the EHT Compressed Beamforming/CQI frame 614, 640, 642 may contain DL compressed CSI information instead of DL compressed beamforming feedback information. Further, each STA, such as STA2 604, STA1 624, STA2 626, transmits multiple SSs over an EHT-LTF field of an EHT PPDU containing EHT Compressed Beamforming/CQI frame 614, 640, 642 where the EHT-LTF field is used for UL CSI estimation for data demodulation and calibration. In this way, AP 602, 622 may be able to determine calibration coefficient for each of its TX antennas according to the DL compressed CSI information included in the EHT Compressed Beamforming/CQI frame 614, 640, 642 and UL CSI estimation.

Figure 7A:
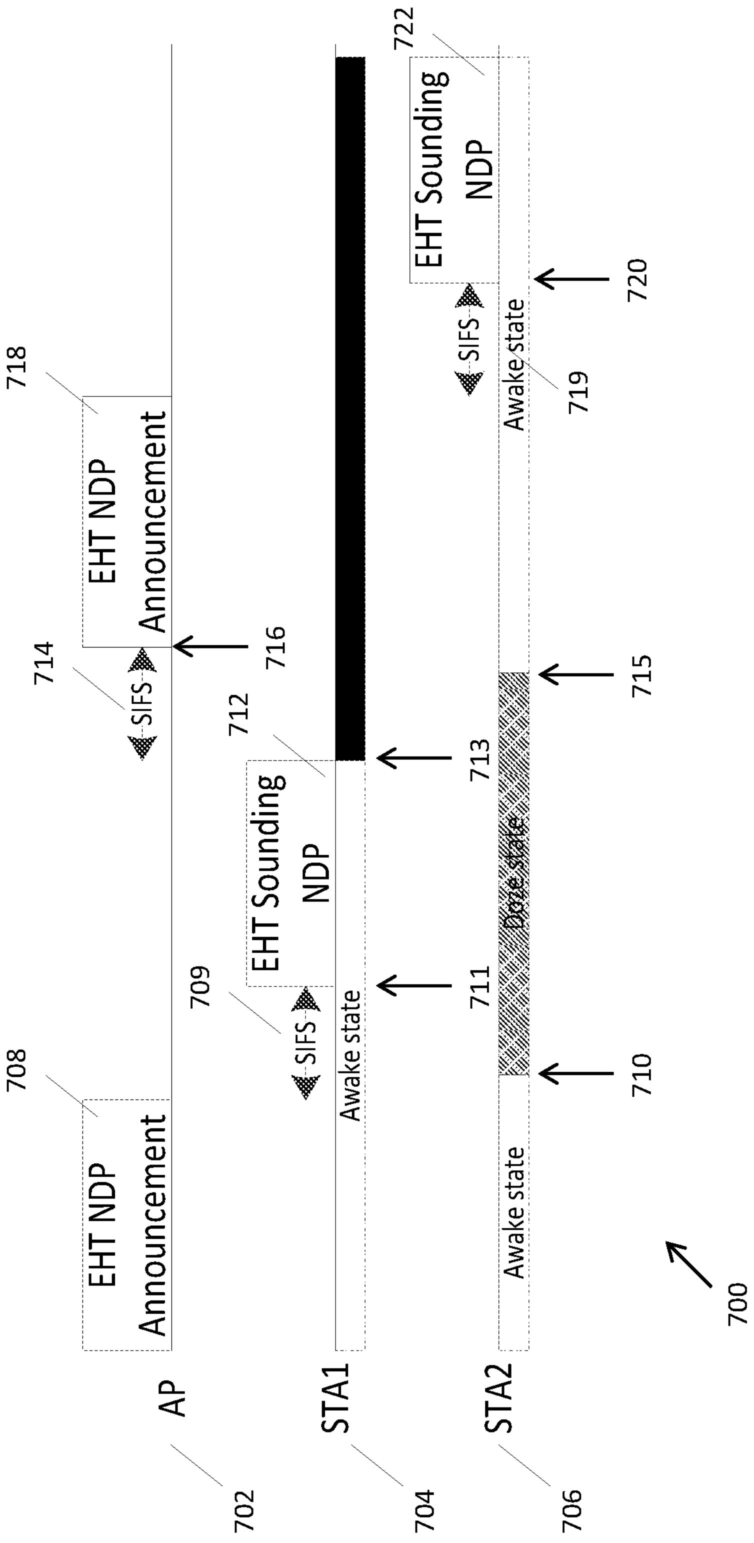
FIG. 7A depicts a flow chart illustrating single-AP based implicit sequential sounding procedure according to an embodiment.

FIG. 7A depicts a flow chart illustrating a single-AP based implicit sequential sounding procedure 700 between an AP 702 and multiple STAs 704, 706 in an 11be EHT WLAN according to an embodiment (option 1). The single-AP based implicit sequential sounding procedure 700 may start when the AP 702 transmits a first EHT NDP Announcement frame 708 to intended STAs such as STA1 704 and STA2 706. The first EHT NDP Announcement frame 708 may indicate STA ordering in which the intended STAs, for example STA1 704 to STA2 706, may transmit an EHT Sounding NDP to the AP 702. The first EHT NDP Announcement frame 708 may also indicate sounding RU allocation and sounding SS allocation for the first STA of the STA ordering. After receiving the EHT NDP Announcement frame 708, other STA(s) that are not the first STA of the STA ordering, for example STA2 706, may be switched from Awake state to Doze state for power save. At 711 after the SIFS 709, the first STA of the STA ordering, for example STA1 704, may prepare a first EHT Sounding NDP 712 based on its sounding RU allocation and sounding SS allocation and transmit it to AP 702. The AP 702 may then estimate first UL CSI from the received first EHT Sounding NDP 712 and determine corresponding DL CSI for the STA1 704 by compensating the first UL CSI according to the calibration parameters which were obtained through a calibration procedure.

After the last symbol of the first EHT Sounding NDP 712 is transmitted at 713, STA1 704 may switch from Awake state to Doze state for power save. During the SIFS 714 at 715, the next STA in the STA ordering, for example STA2 706, may switch from Doze state back to Awake state. After the SIFS 714 at 716, the AP 702 may transmit a second EHT NDP Announcement frame 718, which may indicate sounding RU allocation and sounding SS allocation for the next STA of the STA ordering. Upon transmission of the second EHT NDP Announcement frame 718, a SIFS 719 may take effect, and at 720, the STA2 706 may prepare a second EHT Sounding NDP 722 based on its sounding RU allocation and sounding SS allocation and transmit it to AP 702. The AP 702 may then estimate second UL CSI from the received second EHT Sounding NDP 722 and determine corresponding DL CSI for the STA2 706 by compensating the second UL CSI according to the calibration parameters which were obtained through a calibration procedure. Further, based on the DL CSIs for the STA1 704 and STA2 706, the AP 702 may be able to determine a steering matrix and/or allocate appropriate RUs for each of the STA1 704 and STA2 706 for subsequent transmissions to the STA1 704 and/or STA2 706. Advantageously, single-AP based implicit sequential sounding procedure as illustrated in FIG. 7A may require less sounding overhead than single-AP based explicit sounding procedure as illustrated in FIG. 6B since sounding feedback information needs not to be transmitted.

Figure 7B:
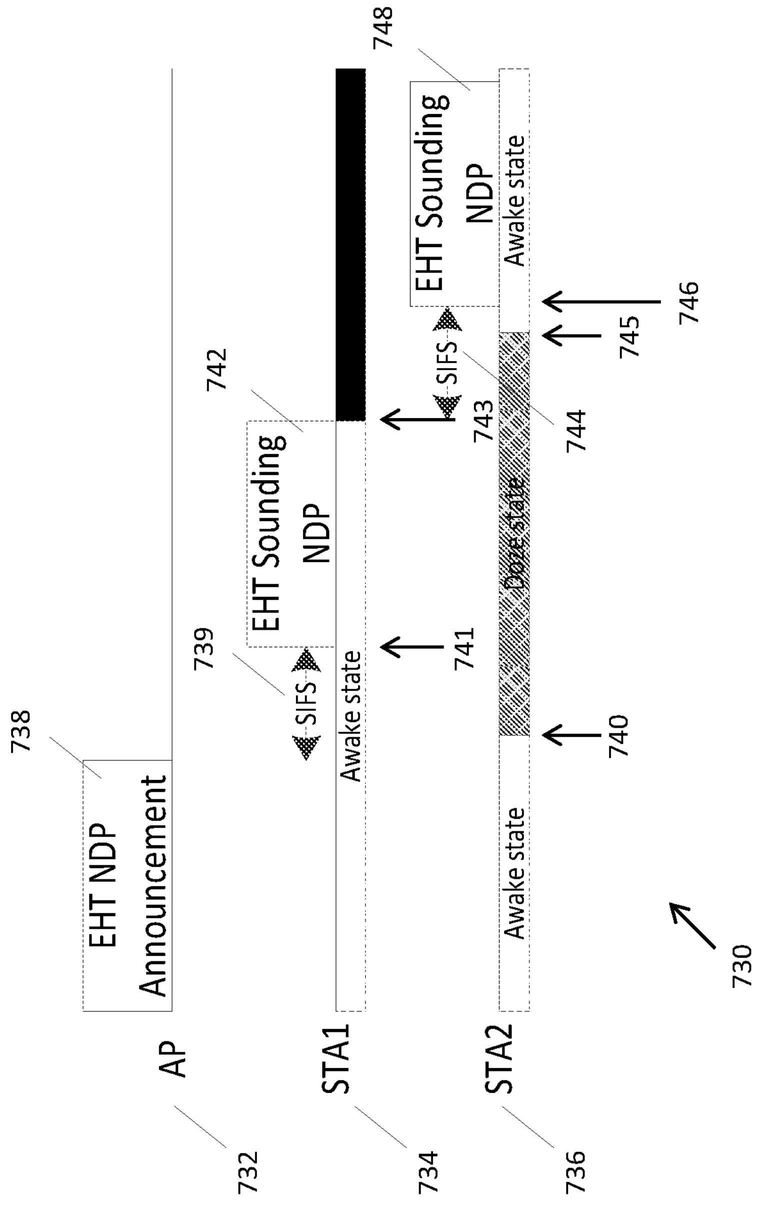
FIG. 7B depicts a flow chart illustrating single-AP based implicit sequential sounding procedure according to another embodiment.

FIG. 7B depicts a flow chart illustrating a single-AP based implicit sequential sounding procedure 730 between an AP 732 and multiple STAs 734, 736 in an 11be EHT WLAN according to another embodiment (option 2). Similarly, the single-AP based implicit sequential sounding procedure 730 may start when the AP 732 transmits an EHT NDP Announcement frame 738 to intended STAs such as STA1 734 and STA2 736. The EHT NDP Announcement frame 738 may indicate STA ordering in which the intended STAs, for example STA1 734 to STA2 736, may transmit an EHT Sounding NDP to the AP 732. The EHT NDP Announcement frame 738 may indicate sounding RU allocation and sounding SS allocation for each of the intended STAs. As such, the EHT-LTF field duration of an EHT Sounding NDP (equivalent to transmission time of the EHT Sounding NDP) transmitted by each STA can be determined from the sounding SS allocation for the STA. Based on the transmission time of an EHT Sounding NDP of each STA, a first EHT Sounding NDP from the first STA of the STA ordering can be followed by a second EHT Sounding NDP from the second STA of the STA ordering.

For example, upon transmission of the EHT NDP Announcement frame 738, a SIFS 739 may take effect, during the SIFS 739 at 740, other STA that are not the first STA in the STA ordering, for example STA2 706, may be switched from Awake state to Doze state for power save, and after the SIFS at 741, the first STA of the STA ordering, for example STA1 734, may transmit a first EHT Sounding NDP 742 to AP 732. The AP 732 may then estimate first UL CSI from the received first EHT Sounding NDP 742 and determine corresponding DL CSI for STA1 734 by compensating the first UL CSI according to the calibration parameters which were obtained through a calibration procedure. After the last symbol of the first EHT Sounding NDP 742 is transmitted at 743, STA1 734 may switch from Awake state to Doze state for power save. A SIFS 744 may take effect, during the SIFS 744 at 745, the STA2 736 may switch from Doze state to Awake state, and after the SIFS 744 at 746, the STA2 736 may transmit a second EHT Sounding NDP 748 to AP 732. The AP 732 may then estimate second UL CSI from the received EHT Sounding NDP 748 and determine corresponding DL CSI for the STA2 736 by compensating the second UL CSI according to the calibration parameters which were obtained through a calibration procedure. Further, based on the DL CSIs for the STA1 734 and STA2 736, the AP 732 may be able to determine a steering matrix and/or allocate appropriate RUs for each of the STA1 734 and STA2 736 for subsequent transmissions to the STA1 734 and/or STA2 736. Advantageously, single-AP based implicit sequential sounding option 2 as illustrated in FIG. 7B further reduces sounding overhead than single-AP based implicit sequential sounding option 1 as illustrated in FIG. 7A.

Figure 8:
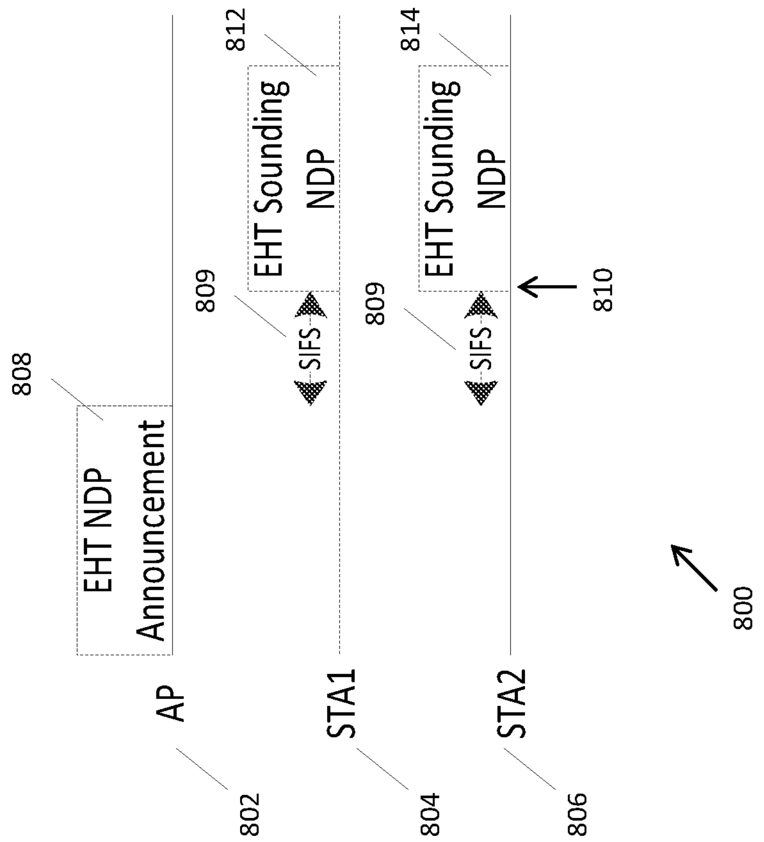
FIG. 8 depicts a flow chart illustrating single-AP based implicit joint sounding procedure according to an embodiment.

FIG. 8 depicts a flow chart illustrating a single-AP based implicit joint sounding procedure 800 between an AP 802 and multiple STAs 804, 806 in an 11be EHT WLAN according to an embodiment. The single-AP based implicit joint sounding procedure 800 may start when the AP 802 transmits an EHT NDP Announcement frame 808 to intended STAs such as STA1 804 and STA2 806. The EHT NDP Announcement frame 808 may indicate sounding RU allocation and sounding SS allocation for each of intended STAs. Upon transmission of the EHT NDP Announcement frame 808, a SIFS 809 may take effect, and at 810, STA1 804 and STA2 806 may transmit respective EHT Sounding NDPs 812, 814 to AP 808 according to respective sounding RU allocation and sounding SS allocation. The AP 802 may then estimate first UL CSI from the received EHT Sounding NDP 812 and second UL CSI from the received EHT Sounding NDP 814 and determine corresponding DL CSIs for the STA1 804 and STA2 806 respectively by compensating the first UL CSI and the second UL CSI according to the calibration parameters which were obtained through a calibration procedure. Further, based on the DL CSIs for the STA1 804 and STA2 806, the AP 802 may be able to determine a steering matrix and/or allocate appropriate RUs for each of the STA1 804 and STA2 806 for subsequent transmissions to the STA1 804 and/or STA2 806. Advantageously, single-AP based implicit joint sounding as illustrated in FIG. 8 may provide less sounding overhead than single-AP based implicit sequential sounding as illustrated in FIG. 7A and FIG. 7B.

Figure 9:
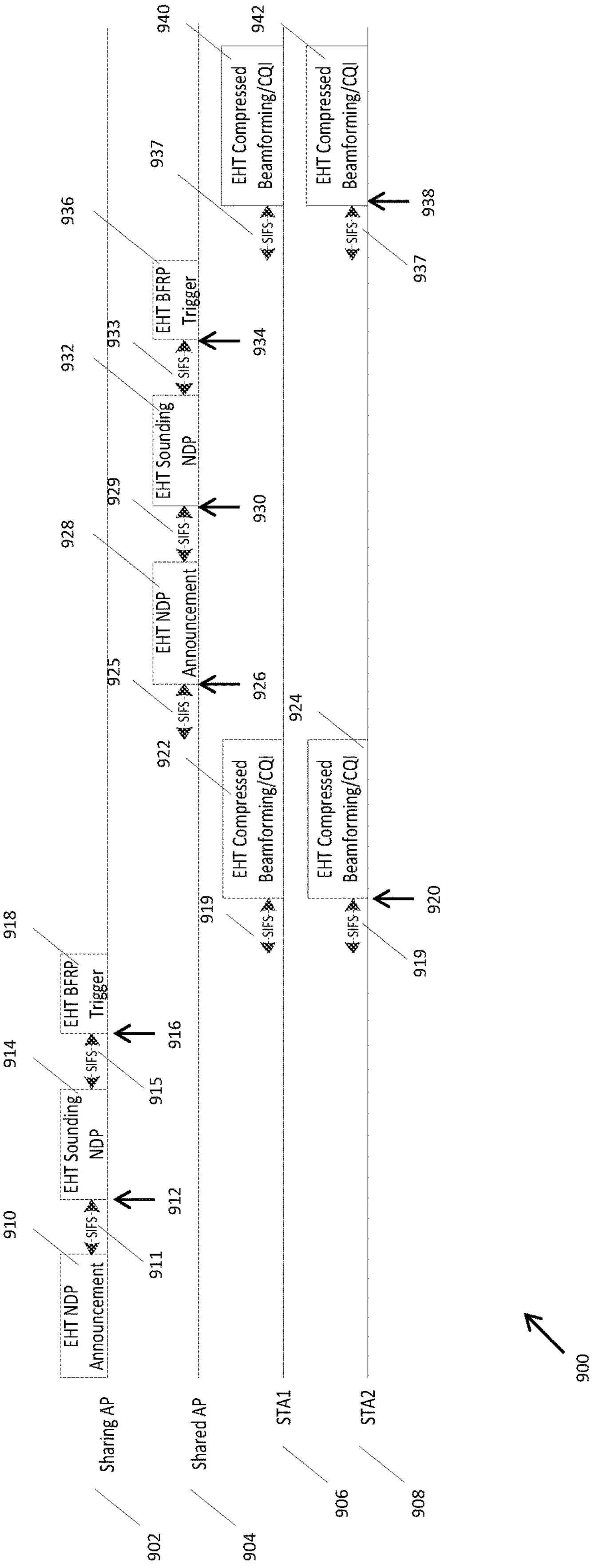
FIG. 9 depicts a flow chart illustrating multi-AP based explicit sequential sounding procedure according to an embodiment.

FIG. 9 depicts a flow chart illustrating a multi-AP based explicit sequential sounding procedure 900 between multiple APs 902, 904 and multiple STAs 906, 908 in an 11be EHT WLAN according to an embodiment. The multi-AP based explicit sequential sounding procedure 900 may start when a sharing AP 902 transmits a first EHT NDP Announcement frame 910 to shared AP(s) that participate into the sounding procedure 1000 and intended STAs such as STA1 906 and STA2 908. The first EHT NDP Announcement frame 910 may indicate shared AP ordering in which the shared AP(s) engaged in the sounding procedure 900 may transmit an EHT NDP Announcement frame and an EHT Sounding NDP to the intended STAs such as STA1 906 and STA2 908. The first EHT NDP Announcement frame 910 may indicate sounding RU allocation and sounding SS allocation for each of shared AP(s) engaged in the sounding procedure 900. Each EHT NDP Announcement frame may indicate requested sounding feedback parameters for each STA such as feedback bandwidth, feedback type, subcarrier grouping, quantization resolution and number of columns of compressed beamforming feedback matrix. The feedback type is one of SU feedback, MU feedback, CQI feedback and calibration feedback. When the feedback type is SU feedback or MU feedback, the requested sounding feedback information comprises compressed beamforming feedback information per subcarrier or subcarrier group. When the feedback type is CQI feedback, the requested sounding feedback information comprises CQI information per subcarrier or subcarrier group. When the feedback type is calibration feedback, the requested sounding feedback information comprises compressed CSI per subcarrier or subcarrier group.

Upon transmission of the first EHT NDP Announcement frame 910, a SIFS 911 may take effect, and at 912, the sharing AP 902 may transmit a first EHT Sounding NDP 914 to STA1 906 and STA2 908. After the first EHT Sounding NDP 914 is transmitted, a SIFS 915 may take effect, and at 916, the sharing AP 902 may transmit an EHT BFRP Trigger frame 918 to solicit simultaneous transmissions of sounding feedback information from STA1 906 and STA2 908. After the last symbol of the EHT BFRP Trigger frame 918 is transmitted, a SIFS 919 may take effect, and at 920, the STA1 906 and STA2 908 may simultaneously transmit respective first EHT Compressed Beamforming/CQI frames 922, 924 comprising sounding feedback information to the sharing AP 902. Based on the received sounding feedback information from the STA1 906 and STA2 908, the sharing AP 902 may be able to determine a steering matrix and/or allocate appropriate RUs for each of the STA1 906 and STA2 908 for subsequent transmissions to the STA1 906 and/or STA2 908.

Upon transmission of the first EHT Compressed Beamforming/CQI frames 922, 924, a SIFS 925 may take effect, and at 926, the next AP in the AP ordering, for example shared AP 904, may transmit a second EHT NDP Announcement frame 928 to STA1 906 and STA2 908. Upon transmission of the second EHT NDP Announcement frame 928, a SIFS 929 may take effect, and at 930, the shared AP 904 may transmit a second EHT Sounding NDP 932 to STA1 906 and STA2 908. Similarly, after the second EHT Sounding NDP 932 is transmitted, a SIFS 933 may take effect, and at 934, the shared AP 904 may transmit an EHT BFRP Trigger frame 918 to solicit simultaneous transmissions of sounding feedback information from STA1 906 and STA2 908. After the last symbol of the EHT BFRP Trigger frame 936 is transmitted, a SIFS 937 may take effect, and at 938, the STA1 906 and STA2 908 may simultaneously transmit respective second EHT Compressed Beamforming/CQI frames 940, 942 comprising sounding feedback information to shared AP 904. Based on the received sounding feedback information from the STA1 906 and STA2 908, the shared AP 904 may be able to determine a steering matrix and/or allocate appropriate RUs for each of the STA1 906 and STA2 908 for subsequent transmissions to the STA1 906 and/or STA2 908.

According to the present disclosure, when the sounding type indicated in the EHT NDP Announcement frame 910, 1010 is multi-AP based explicit sounding and the feedback type indicated in the EHT NDP Announcement frame 910, 1010 is SU, MU or CQI feedback, the procedure 900, 1000 is a normal multi-AP based explicit sounding procedure; whereas when the sounding type indicated in the EHT NDP Announcement frame 910, 1010 is multi-AP based explicit sounding and the feedback type indicated in the EHT NDP Announcement frame 910, 1010 is calibration feedback, the procedure 900, 1000 is a multi-AP based calibration procedure. In other words, multi-AP based calibration procedure is a variant of multi-AP based explicit sounding procedure as illustrated in FIG. 9 and FIG. 10. Advantageously, according to the present disclosure, a single procedure 900, 1000 can be used for the purpose of both calibration and explicit sounding.

In various embodiments, when the procedure 900, 1000 is a multi-AP based calibration procedure, the EHT NDP Announcement frame 910, 928, 1010 may indicate calibration RU allocation and calibration SS allocation for each STA, such as STA1 906, STA2 908, STA1 1006, STA2 1008. In particular, data RU allocation and data SS allocation for each STA are indicated in the corresponding EHT BFRP Trigger frame 918, 936, 1020. Calibration SSs allocated to a STA may include data SSs allocated to the STA. In other words, number of calibration SSs may be equal to or larger than number of data SSs. Calibration RUs allocated to a STA may be the same as data RUs allocated to the STA.

In various embodiments, when the procedure 900, 1000 is a multi-AP based calibration procedure, EHT Compressed Beamforming/CQI frame 922, 924, 940, 942, 1024, 1026 may contain DL compressed CSI instead of DL compressed beamforming feedback information. Further, each STA, such as STA1 906, STA2 908, STA1 1006, STA2 1008, transmits multiple SSs over an EHT-LTF field of an EHT PPDU containing EHT Compressed Beamforming/CQI frame 922, 924, 940, 942, 1024, 1026 where the EHT-LTF field is used for UL CSI estimation for data demodulation and calibration. In this way, AP 902, 904, 1002, 1004 may be able to determine calibration coefficient for each of its TX antennas according to the DL compressed CSI included in the EHT Compressed Beamforming/CQI frame 922, 924, 940, 942, 1024, 1026 and UL CSI estimation.

In various embodiments, there are two options for a STA to transmit an EHT Compressed Beamforming/CQI frame in a multi-AP based sequential calibration procedure: i) a STA may transmit same SSs over the EHT-LTF fields of multiple EHT PPDUs containing EHT Compressed Beamforming/CQI frames; or ii) a STA may transmit different SSs over the EHT-LTF fields of multiple EHT PPDUs containing EHT Compressed Beamforming/CQI frames, which as a result, EHT-LTF overhead may advantageously be reduced. For example, with an assumption of STA1 906 or STA2 908 has four TX antennas and transmits two EHT Compressed Beamforming/CQI frames, under option 1, the STA1 904 and STA2 908 may transmit four SSs over eight EHT-LTF symbols of EHT PPDUs containing EHT Compressed Beamforming/CQI frames 922, 924, 940, 942 using $P_{8\times8}$ matrix; whereas under option 2, the STA1 906 and STA2 908 may transmit two SSs over four EHT-LTF symbols of EHT PPDUs containing first EHT Compressed Beamforming/CQI frames 922, 924 using $P_{4\times4}$ matrix, and the STA1 906 and STA2 908 may transmit another two SSs over four EHT-LTF symbols of EHT PPDUs containing second EHT Compressed Beamforming/CQI frames 940, 942 using $P_{4\times4}$ matrix.

FIG. 10 depicts a flow chart illustrating a multi-AP based explicit joint sounding procedure 1000 between multiple APs 1002, 1004 and multiple STAs 1006, 1008 in an 11be EHT WLAN according to an embodiment. The multi-AP based explicit joint sounding procedure 1000 may start when a sharing AP 1002 transmits an EHT NDP Announcement frame 1010 to shared AP(s) that participate into the sounding procedure 1000 and intended STAs such as STA1 1006 and STA2 1008. The EHT NDP Announcement frame 1010 may indicate sounding RU allocation and sounding SS allocation for each shared AP that engaged in the sounding procedure 1000. The EHT NDP Announcement frame 1010 may indicate requested sounding feedback parameters for each pair of STA and AP among sharing AP 1002, shared AP 1004 and intended STAs 1006, 1008. The requested sounding feedback parameters for each AP-STA pair may comprise AP dependent sounding feedback parameters such as feedback bandwidth and the number of columns of compressed beamforming feedback matrix; and AP independent sounding feedback parameters such as feedback type, subcarrier grouping and quantization resolution, where in term of sounding results used for joint beamforming, for a STA, each AP independent sounding feedback parameter may be set to a same value for all AP-STA pairs in the EHT NDP Announcement frame 1010; whereas each AP dependent sounding feedback parameter may be set to a different value for each AP-STA pair in the EHT NDP Announcement frame 1010.

Upon transmission of the EHT NDP Announcement frame 1010, a SIFS 1011 may take effect, and at 1012, all APs engaged in the sounding procedure 1000 such as sharing AP 1002 and shared AP 1004 may simultaneously transmit respective EHT Sounding NDPs 1014, 1016 to all intended STAs such as STA1 1006 and STA2 1008. After the EHT Sounding NDPs 1014, 1016 are transmitted, a SIFS 1017 may take effect, and at 1018, the AP 1002 may transmit an EHT BFRP Trigger frame 1020 to solicit simultaneous transmissions of sounding feedback information from STA1 1006 and STA2 1008. After the last symbol of the EHT BFRP Trigger frame 1020 is transmitted, a SIFS 1021 may take effect, and at 1022, the STA1 1006 and STA2 1008 may simultaneously transmit respective EHT Compressed Beamforming/CQI frames 1024, 1026 comprising the requested sounding feedback information to APs 1002, 1004. Based on the received sounding feedback information from the STA1 1006 and STA2 1008, the AP 1002, 1004 may be able to determine a steering matrix and/or allocate appropriate RUs for each of the STA1 1006 and STA2 1008 for subsequent transmissions to the STA1 1006 and/or STA2 1008. Alternatively, the sharing AP 1002 may be able to determine a steering matrix and/or allocate appropriate RUs for each AP-STA pair. The sharing AP 1002 may then inform shared AP 1004 of the corresponding steering matrices and/or RU allocations for the STA1 1006 and STA2 1008 for subsequent transmissions to the STA1 1006 and/or STA2 1008. Advantageously, multi-AP based explicit joint sounding as illustrated in FIG. 10 has less sounding overhead than multi-AP based explicit sequential sounding as illustrated in FIG. 9.

Figure 11A:
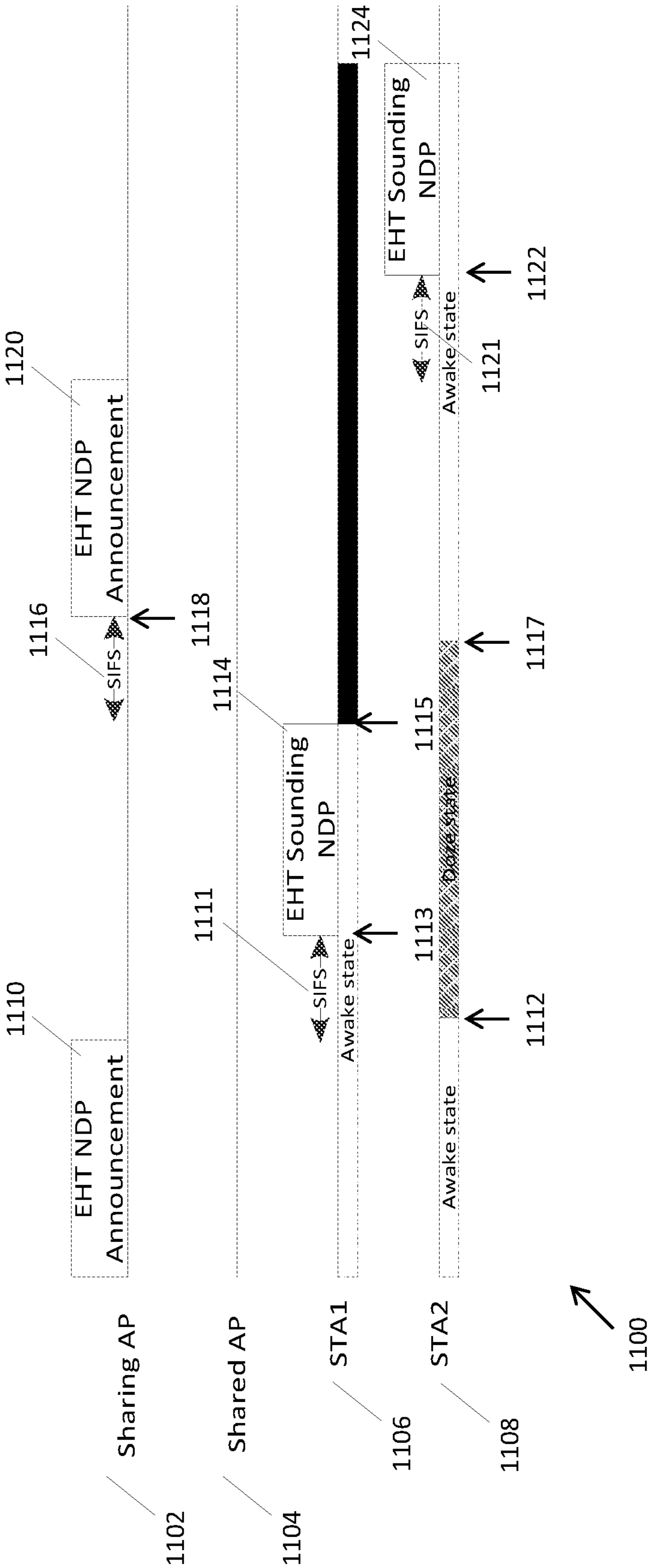
FIG. 11A depicts a flow chart illustrating multi-AP based implicit sequential sounding procedure according to an embodiment.

FIG. 11A depicts a flow chart illustrating a multi-AP based implicit sequential sounding procedure 1100 between multiples APs 1102, 1104 and multiple STAs 1106, 1108 in an 11be EHT WLAN according to an embodiment (option 1). The multi-AP based implicit sequential sounding procedure 1100 may start when a sharing AP 1102 transmits a first EHT NDP Announcement frame 1110 to shared AP(s) that participate into the sounding procedure 1100 and intended STAs such as STA1 1106 and STA2 1108. The first EHT NDP Announcement frame 1110 may indicate shared AP(s) that participate into the sounding procedure 1100, e.g. shared AP 1104. The first EHT NDP Announcement frame 1110 may also indicate STA ordering in which the intended STAs, for example STA1 1106 to STA2 1108, may transmit an EHT Sounding NDP to the sharing AP 1102 and all the shared APs that participate into the sounding procedure 1100. Each EHT NDP Announcement frame 1110, 1120 may indicate sounding RU allocation and sounding SS allocation for a corresponding STA. Upon transmission of the first EHT NDP Announcement frame 1110, a SIFS 1111 may take effect. During the SIFS 1111 at 1112, other STA(s) that are not the first STA of the STA ordering, for example STA2 1108, may be switched from Awake state to Doze state for power save, and after the SIFS at 1113, the first STA of the STA ordering, for example STA1 1106, may transmit a first EHT Sounding NDP 1114 to sharing AP 1102 and shared AP 1104. The sharing AP 1102 and shared AP 1104 may then estimate UL CSI from the received first EHT Sounding NDP 1114 and determine DL CSI for the STA1 1106 by compensating the UL CSI according to the calibration parameters which were obtained through a calibration procedure. Further, based on the DL CSI for the STA1 1106, the sharing AP 1102 and shared AP 1104 may be able to determine a steering matrix and/or allocate appropriate RUs for the STA1 1106 for subsequent transmissions to the STA1 1106.

After the last symbol of the first EHT Sounding NDP 1114 is transmitted at 1115, STA1 1106 may switch from Awake state to Doze state for power save. A SIFS 1116 may take effect, during the SIFS 1116 at 1117, the next STA in the STA ordering, for example STA2 1108, may switch from Doze state to Awake state, and after the SIFS 1116 at 1118, the AP 1102 may transmit a second EHT NDP Announcement frame 1120. Upon transmission of the second EHT NDP Announcement frame 1120, a SIFS 1121 may take effect, and at 1122, the STA2 1108 may transmit a second EHT Sounding NDP 1124 to sharing AP 1102 and shared AP 1104. The sharing AP 1102 and shared AP 1104 then estimate UL CSI from the received second EHT Sounding NDP 1124 and determines DL CSI for the STA2 1108 by compensating the UL CSI according to the calibration parameters which were obtained through a calibration procedure. Further, based on the DL CSI for STA2 1108, the sharing AP 1102 and shared AP 1104 may be able to determine a steering matrix and/or allocate appropriate RUs for the STA2 1108 for subsequent transmissions to the STA2 1108. Advantageously, multi-AP based implicit sequential sounding procedure as illustrated in FIG. 11A may require less sounding overhead than multi-AP based explicit sounding procedure as illustrated in FIG. 9 or FIG. 10 since sounding feedback information needs not to be transmitted.

Figure 11B:
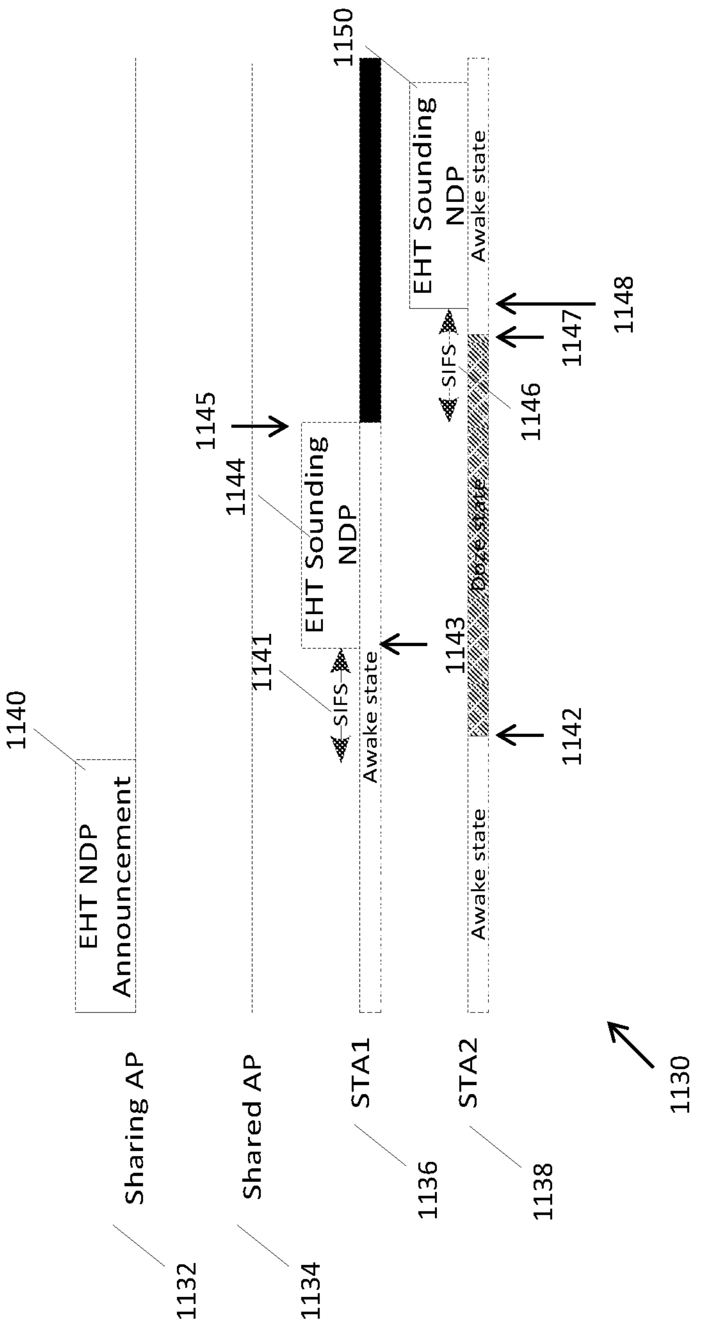
FIG. 11B depicts a flow chart illustrating multi-AP based implicit sequential sounding procedure according to another embodiment.

FIG. 11B depicts a flow chart illustrating a multi-AP based implicit sequential sounding procedure 1130 between multiples APs 1132, 1134 and multiple STAs 1136, 1138 in an 11be EHT WLAN according to another embodiment (option 2). Similarly, the multi-AP based implicit sequential sounding procedure 1130 may start when the AP 1132 transmits an EHT NDP Announcement frame 1140 to shared AP(s) that participate into the sounding procedure 1130 and intended STAs such as STA1 1136 and STA2 1138. The EHT NDP Announcement frame 1140 indicates shared AP(s) that participate into the sounding procedure 1130, e.g. shared AP 1134. The EHT NDP Announcement frame 1140 may indicate STA ordering in which the intended STAs, for example STA1 1136 to STA2 1138, may transmit an EHT Sounding NDP to the AP 1132 and shared AP(s) that participate into the sounding procedure 1130. The EHT NDP Announcement frame 1140 may further indicate sounding RU allocation and sounding SS allocation for each STA. As such, the EHT-LTF field duration of an EHT Sounding NDP (equivalent to transmission time of an EHT Sounding NDP) transmitted by each STA can be determined from the SS allocation for the STA. Based on the transmission time of an EHT Sounding NDP of each STA, a first EHT Sounding NDP from the first STA of the STA ordering can be followed by a second EHT Sounding NDP from the second STA of the STA ordering.

For example, upon transmission of the EHT NDP Announcement frame 1140, a SIFS 1141 may take effect, during the SIFS 1141 at 1142, other STA that are not the first STA in the STA ordering, for example STA2 1138, may be switched from Awake state to Doze state for power save, and after the SIFS at 1143, the first STA of the STA ordering, for example STA1 1136, may transmit a first EHT Sounding NDP 1144 to the sharing AP 1132 and shared AP 1134. The sharing AP 1132 and shared AP 1134 may then estimate UL CSI from the received first EHT Sounding NDP 1144 and determine DL CSI for the STA1 1136 by compensating the UL CSI according to the calibration parameters which were obtained through a calibration procedure. After the last symbol of the first EHT Sounding NDP 1144 is transmitted at 1145, STA1 1136 may switch from Awake state to Doze state for power save. A SIFS 1148 may take effect, during the SIFS 1148 at 1147, the STA2 1138 may switch from Doze state back to Awake state, and after the SIFS 1146 at 1148, the STA2 1138 may transmit a second EHT Sounding NDP 1150 to the sharing AP 1132 and shared AP 1134. The sharing AP 1132 and shared AP 1134 may then estimate UL CSI from the received second EHT Sounding NDP 1150 and determines DL CSI for the STA2 1138 by compensating the UL CSI according to the calibration parameters which were obtained through a calibration procedure. Further, based on the DL CSIs for the STA1 1136 and STA2 1138, the sharing AP 1132 and shared AP 1134 may be able to determine a steering matrix and/or allocate appropriate RUs for each of the STA1 1136 and STA2 1138 for subsequent transmissions to the STA1 1136 and/or STA2 1138. Advantageously, multi-AP based implicit sequential sounding option 2 illustrated in FIG. 11B further reduces sounding overhead than multi-AP based implicit sequential sounding option 1 illustrated in FIG. 11A.

Figure 12:
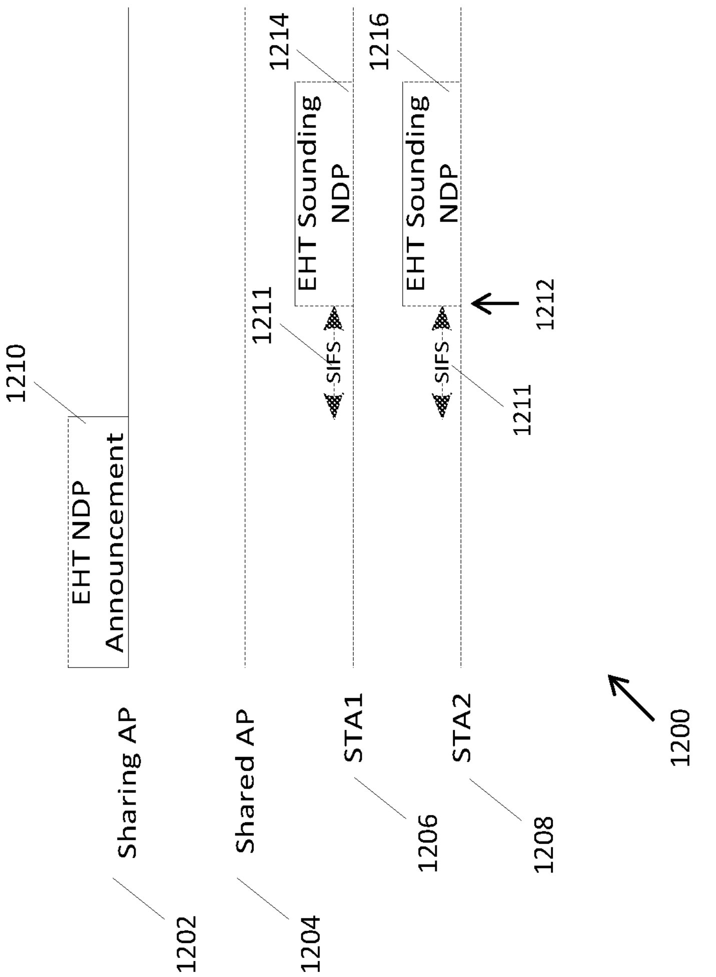
FIG. 12 depicts a flow chart illustrating multi-AP based implicit joint sounding procedure according to an embodiment.

FIG. 12 depicts a flow chart illustrating a multi-AP based implicit joint sounding procedure 1200 between multiple APs 1202, 1204 and multiple STAs 1206, 1208 in an 11be EHT WLAN according to an embodiment. The multi-AP based implicit joint sounding procedure 1200 may start when sharing AP 1202 transmits an EHT NDP Announcement frame 1210 to shared AP(s) that participate into the sounding procedure 1200 such as shared AP 1204 and intended STAs such as STA1 1206 and STA2 1208. The EHT NDP Announcement frame 1210 may indicate shared AP(s) that participate into the sounding procedure 1200, and may also indicate sounding RU allocation and sounding SS allocation for each STA. Upon transmission of the EHT NDP Announcement frame 1210, a SIFS 1211 may take effect, and at 1212, STA1 1206 and STA2 1208 may transmit respective EHT Sounding NDPs 1214, 1216 to sharing AP 1202 and shared AP 1204. The sharing AP 1202 and shared AP 1204 may then estimate first UL CSI from the received EHT Sounding NDP 1214 and determine DL CSI for the STA1 1206 by compensating the first UL CSI according to the calibration parameters which were obtained through a calibration procedure. Similarly, the sharing AP 1202 and shared AP 1204 may estimate second UL CSI from the received EHT Sounding NDP 1216 and determine DL CSI for the STA2 1208 by compensating the second UL CSI according to the calibration parameters which were obtained through a calibration procedure. Further, based on the DL CSIs for the STA1 1206 and STA2 1208, the sharing AP 1202 and shared AP 1204 may be able to determine a steering matrix and/or allocate appropriate RUs for each of the STA1 1206 and STA2 1208 for subsequent transmissions to the STA1 1206 and/or STA2 1208. Advantageously, multi-AP based implicit joint sounding as illustrated in FIG. 12 may require less sounding overhead than multi-AP based implicit sequential sounding as illustrated in FIG. 11A and FIG. 11B.

According to the present disclosure, sharing AP and shared AP(s) that are engaged in a multi-AP based hybrid sounding procedure are divided into two groups, where group 1 APs comprises AP(s) that participate into an explicit sounding portion of the multi-AP based hybrid sounding procedure and group 2 APs comprises AP(s) that participate into an implicit sounding portion of the multi-AP based hybrid sounding procedure.

Figure 13A:
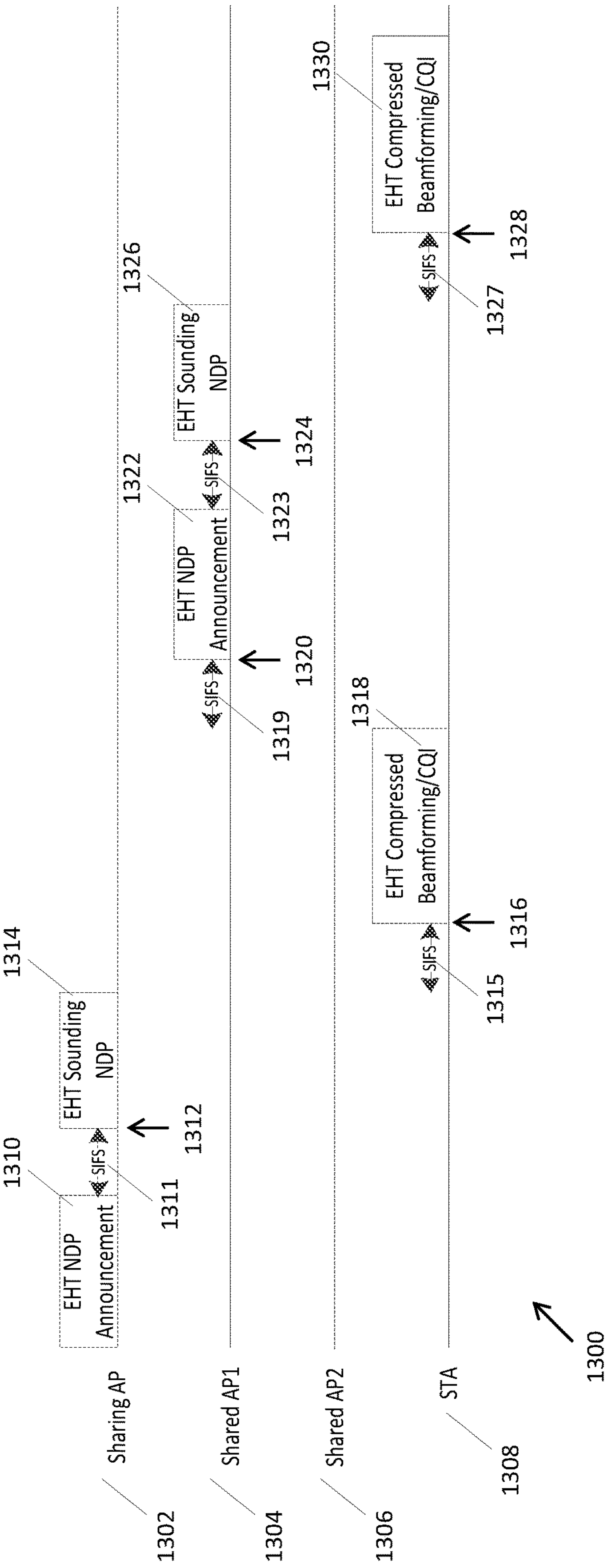
FIG. 13A depicts a flow chart illustrating multi-AP based hybrid sequential sounding procedure according to an embodiment.

FIG. 13A depicts a flow chart illustrating a multi-AP based hybrid sequential sounding procedure 1300 between multiple APs 1302, 1304, 1306 and a STA 1308 in an 11be EHT WLAN according to an embodiment. In this embodiment, sharing AP 1302 and shared AP1 1304 are group 1 APs, whereas shared AP2 1306 is a group 2 AP. The multi-AP base hybrid sequential sounding procedure 1300 may start when the sharing AP 1302 transmits a first EHT NDP Announcement frame 1310 to all shared AP(s) that participate into the sounding procedure 1300 (e.g. shared APs 1304, 1306) and intended STA 1308. The first EHT NDP Announcement frame 1310 may indicate group 2 APs and ordering of group 1 APs in which each of the group 1 APs may transmit an EHT NDP Announcement frame and an EHT Sounding NDP to intended STA. The first EHT NDP Announcement frame 1310 may indicate sounding RU allocation and sounding SS allocation for each of group 1 APs. Each EHT NDP Announcement frame may indicate sounding RU allocation and sounding SS allocation for the intended STA 1308. Each EHT NDP Announcement frame may indicate request sounding feedback parameters for the intended STA 1308 such as feedback bandwidth, feedback type, subcarrier grouping, quantization resolution and number of columns in compressed beamforming feedback matrix. The feedback type is one of SU feedback, MU feedback and CQI feedback. Upon transmission of the first EHT NDP Announcement frame 1310, a SIFS 1311 may take effect, and at 1312, sharing AP 1302 may transmit a first EHT Sounding NDP 1314 to STA 1308. After the last symbol of the first EHT Sounding NDP 1314 is transmitted, a SIFS 1315 may take effect, and at 1316, the STA 1308 transmits a first EHT Compressed Beamforming/CQI frame 1318 comprising sounding feedback information to the sharing AP 1302. It is noted that the EHT-LTF field of EHT PPDU containing the first EHT Compressed Beamforming/CQI frame 1318 can also be used for CSI estimation for implicit sounding with group 2 AP(s), e.g. shared AP2 1306. Based on the received sounding feedback information from STA 1308, sharing AP 1302 may be able to determine a steering matrix and/or allocate appropriate RUs for the STA 1308 for subsequent transmissions to the STA 1308.

Upon transmission of the first EHT Compressed Beamforming/CQI frame 1318, a SIFS 1319 may take effect, and at 1320, the next AP in the ordering of group 1 APs, for example shared AP1 1304, may transmit a second EHT NDP Announcement frame 1322 to STA 1308. Upon transmission of the second EHT NDP Announcement frame 1322, a SIFS 1323 may take effect, and at 1324, the shared AP1 1304 may transmit a second EHT Sounding NDP 1326 to STA 1308. Similarly, after the second EHT Sounding NDP 1326 is transmitted, a SIFS 1327 may take effect, and at 1328, the STA 1308 may transmit a second EHT Compressed Beamforming/CQI frame 1330 comprising sounding feedback information to the shared AP1 1304. It is noted that the EHT-LTF field of EHT PPDU containing the second EHT Compressed Beamforming/CQI frame 1330 can also be used for implicit sounding with group 2 AP(s), e.g. shared AP2 1306. Based on the received sounding feedback information from STA 1308, sharing AP 1304 may be able to determine a steering matrix and/or allocate appropriate RUs for the STA 1308 for subsequent transmissions to the STA 1308. Further, shared AP2 1306 may be able to estimate UL CSI from the EHT-LTF fields of EHT PPDUs containing the first and second EHT Compressed Beamforming/CQI frame 1318, 1330 and determine corresponding DL CSI for the STA 1308 by compensating the UL CSI according to the calibration parameters which were obtained through a calibration procedure; and then shared AP 1306 may be able to determine a steering matrix and/or allocate appropriate RUs for the STA 1308 based on the DL CSI for subsequent transmissions to the STA 1308.

Figure 13B:
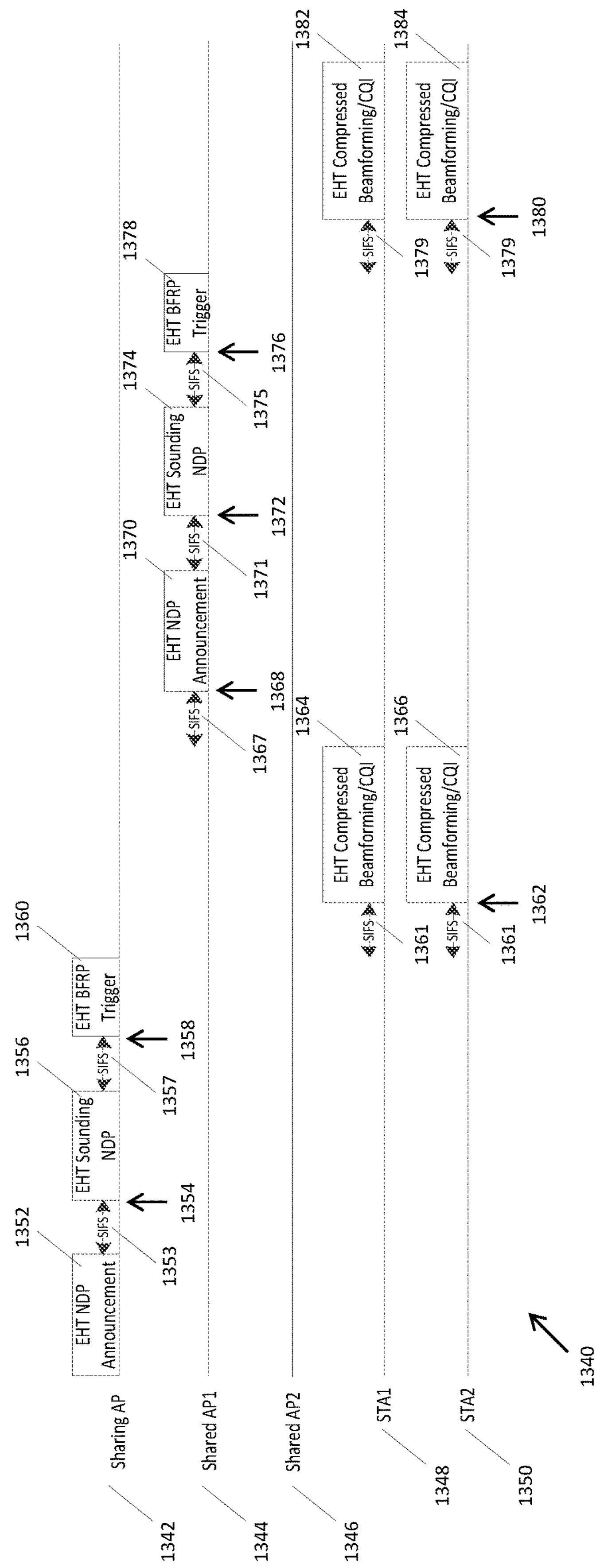
FIG. 13B depicts a flow chart illustrating multi-AP based hybrid sequential sounding procedure according to another embodiment.

FIG. 13B depicts a flow chart illustrating a multi-AP based hybrid sequential sounding procedure 1340 between multiple APs 1342, 1344, 1346 and multiple STAs 1348, 1350 in an 11be EHT WLAN according to an embodiment. In this embodiment, sharing AP 1342 and shared AP1 1344 are group 1 APs, whereas shared AP2 1346 is a group 2 AP. The multi-AP base hybrid sequential sounding procedure 1340 may start when the sharing AP 1342 transmits a first EHT NDP Announcement frame 1352 to all shared AP(s) that participate into the sounding procedure 1340 (e.g. shared APs 1344, 1346) and intended STAs 1348, 1350. The first EHT NDP Announcement frame 1352 may indicate group 2 APs and ordering of group 1 APs in which each of the group 1 APs may transmit an EHT NDP Announcement frame and an EHT Sounding NDP to intended STA. The first EHT NDP Announcement frame 1352 may indicate sounding RU allocation and sounding SS allocation for each of group 1 APs. Each EHT NDP Announcement frame may indicate sounding RU allocation and sounding SS allocation for each of the STA1 1348 and STA2 1350. In particular, data RU allocation and data SS allocation for each of the STA1 1348 and STA2 1350 are indicated in the corresponding EHT BFRP Trigger frame. Sounding SSs may include data SSs. In other words, the number of sounding SSs may be equal to or larger than number of data SSs. Data RU allocation may be the same as sounding RU allocation for each STA. Each EHT NDP Announcement frame may indicate request sounding feedback parameters for each of the intended STAs 1348, 1350 such as feedback bandwidth, feedback type, subcarrier grouping, quantization resolution and number of columns in compressed beamforming feedback matrix. The feedback type is one of SU feedback, MU feedback and CQI feedback. Upon transmission of the first EHT NDP Announcement frame 1352, a SIFS 1353 may take effect, and at 1354, sharing AP 1342 may transmit a first EHT Sounding NDP 1356 to STA1 1348 and STA2 1350. After the last symbol of the first EHT Sounding NDP 1356 is transmitted, a SIFS 1357 may take effect, and at 1358, the sharing AP 1342 may transmit an EHT BFRP Trigger frame 1360 to solicit simultaneous transmissions of sounding feedback information from the STA1 1348 and STA2 1350. Upon reception of the EHT BFRP Trigger frame 1360, a SIFS 1361 may take effect, and at 1362, the STA1 1348 and STA2 1350 simultaneously transmit respective first EHT Compressed Beamforming/CQI frames 1364, 1366 comprising sounding feedback information to the sharing AP 1342. It is noted that the EHT-LTF fields of EHT PPDUs containing the first EHT Compressed Beamforming/CQI frames 1364, 1366 can also be used for CSI estimation for implicit sounding with group 2 AP(s), e.g. shared AP2 1346. Based on the received sounding feedback information from STA1 1348 and STA2 1350, sharing AP 1342 may be able to determine a steering matrix and/or allocate appropriate RUs for each of the STA1 1348 and STA2 1350 for subsequent transmissions to the STA1 1348 and/or STA2 1350.

Upon transmission of the first EHT Compressed Beamforming/CQI frame 1364, 1366, a SIFS 1367 may take effect, and at 1368, the next AP in the ordering of group 1 APs, for example shared AP1 1344, may transmit a second EHT NDP Announcement frame 1370 to STA1 1348 and STA2 1350. Upon transmission of the second EHT NDP Announcement frame 1370, a SIFS 1371 may take effect, and at 1372, the shared AP1 1344 may transmit a second EHT Sounding NDP 1374 to STA1 1348 and STA2 1350. Similarly, after the second EHT Sounding NDP 1374 is transmitted, a SIFS 1375 may take effect, and at 1376, the sharing AP 1342 may transmit an EHT BFRP Trigger frame 1378 to solicit simultaneous transmissions of sounding feedback information from the STA1 1348 and STA2 1350. Upon reception of the EHT BFRP Trigger frame 1378, a SIFS 1379 may take effect, and at 1380, the STA1 1348 and STA2 1350 simultaneously transmit respective second EHT Compressed Beamforming/CQI frames 1382, 1384 comprising sounding feedback information to the sharing AP 1344. It is noted that the EHT-LTF fields of EHT PPDUs containing the second EHT Compressed Beamforming/CQI frames 1382, 1384 can also be used for CSI estimation for implicit sounding with group 2 AP(s), e.g. shared AP2 1346. Based on the received sounding feedback information from STA1 1348 and STA2 1350, the shared AP1 1344 may be able to determine a steering matrix and/or allocate appropriate RUs for each of the STA1 1348 and STA2 1350 for subsequent transmissions to the STA1 1348 and/or STA2 1350. Further, the shared AP2 1346 may be able to estimate UL CSI from the EHT-LTF fields of EHT PPDUs containing the first and second EHT Compressed Beamforming/CQI frame 1364, 1382 and determine DL CSI for the STA1 1348 by compensating the UL CSI according to the calibration parameters which were obtained through a calibration procedure; and then the shared AP2 1346 may be able to determine a steering matrix and/or allocate appropriate RUs for the STA1 1348 based on the DL CSI for subsequent transmissions to the STA1 1348. Similarly, the shared AP2 1346 may be able to estimate UL CSI from the EHT-LTF fields of EHT PPDUs containing the first and second EHT Compressed Beamforming/CQI frame 1366, 1384 and determine DL CSI for the STA2 1350 by compensating the UL CSI according to the calibration parameters which were obtained through a calibration procedure; and then shared AP2 1346 may be able to determine a steering matrix and/or allocate appropriate RUs for the STA2 1350 based on the DL CSI for subsequent transmissions to the STA2 1350.

Figure 14A:
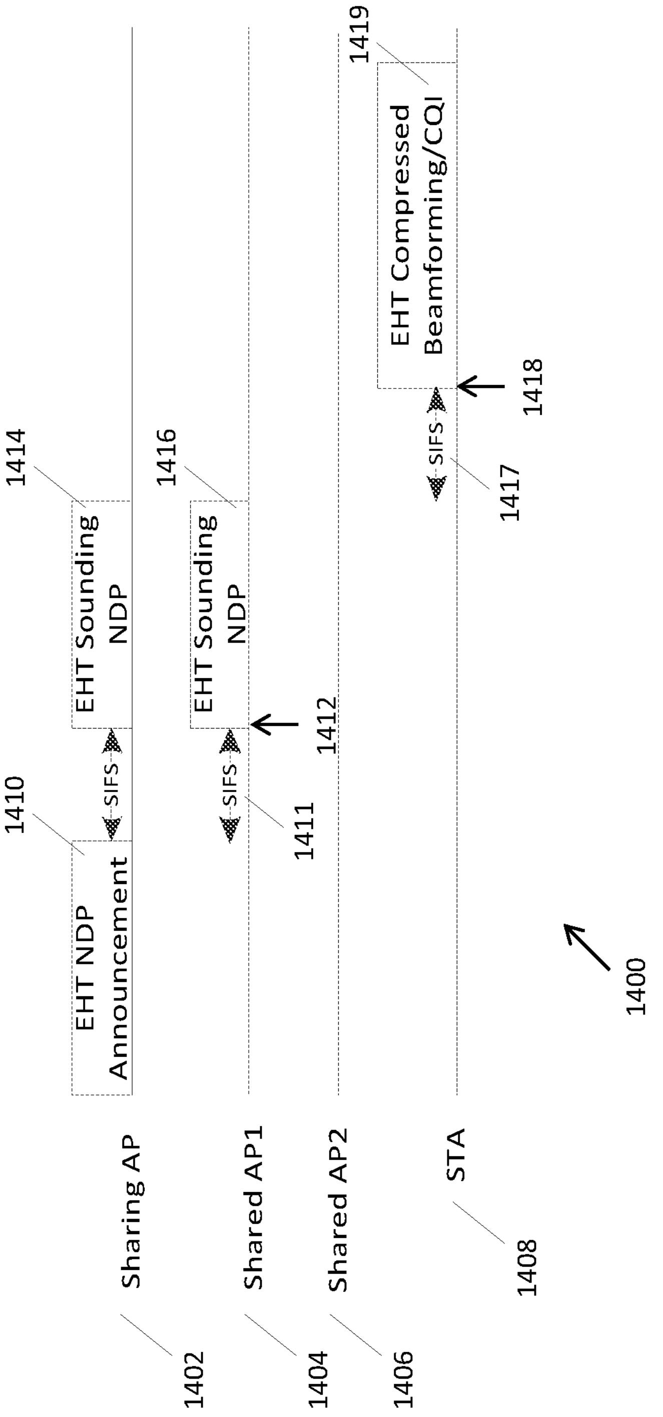
FIG. 14A depicts a flow chart illustrating multi-AP based hybrid joint sounding procedure according to an embodiment.

FIG. 14A depicts a flow chart illustrating a multi-AP based hybrid joint sounding procedure 1400 between multiple APs 1402, 1404, 1406 and a STA 1408 in an 11be EHT WLAN according to an embodiment. In this embodiment, sharing AP 1402 and shared AP1 1404 are group 1 APs, whereas shared AP2 1406 is a group 2 AP. The multi-AP base hybrid sequential sounding procedure 1400 may start when the sharing AP 1402 transmits an EHT NDP Announcement frame 1410 to all shared AP(s) that participate into the sounding procedure 1400 (e.g. shared APs 1404, 1406) and intended STA 1408. The EHT NDP Announcement frame 1410 may indicate group 2 APs and group 1 APs in which each of the group 1 APs may transmit an EHT Sounding NDP to intended STA. The EHT NDP Announcement frame 1410 may indicate sounding RU allocation and sounding SS allocation for each of group 1 APs.

The EHT NDP Announcement frame may indicate sounding RU allocation and sounding SS allocation for the intended STA 1408. The EHT NDP Announcement frame may indicate request sounding feedback parameters for each pair of the intended STA 1408 and group 1 AP such as feedback bandwidth, feedback type, subcarrier grouping, quantization resolution and number of columns in compressed beamforming feedback matrix. The feedback type is one of SU feedback, MU feedback and CQI feedback. Upon transmission of the EHT NDP Announcement frame 1410, a SIFS 1411 may take effect, and at 1412, sharing AP 1402 and shared AP 1404 may simultaneously transmit respective EHT Sounding NDP 1414, 1416 to STA 1408. After the last symbols of the EHT Sounding NDPs 1414, 1416 are transmitted, a SIFS 1417 may take effect, and at 1418, the STA 1408 transmits an EHT Compressed Beamforming/CQI frame 1419 comprising sounding feedback information to the sharing AP 1402 and shared AP1 1404. It is noted that the EHT-LTF field of EHT PPDU containing the EHT Compressed Beamforming/CQI frame 1419 can also be used for CSI estimation for implicit sounding with group 2 AP(s), e.g. shared AP2 1406. Based on the received sounding feedback information from the STA 1408, the sharing AP 1402 and shared AP1 1404 may be able to determine a steering matrix and/or allocate appropriate RUs for the STA 1408 for subsequent transmissions to the STA 1408. Further, the shared AP2 1406 may be able to estimate UL CSI from the EHT-LTF field of EHT PPDU containing the EHT Compressed Beamforming/CQI frame 1419 and determine DL CSI for the STA 1408 by compensating the UL CSI according to the calibration parameters which were obtained through a calibration procedure; and then the shared AP2 1406 may be able to determine a steering matrix and/or allocate appropriate RUs for the STA 1408 based on the DL CSI for subsequent transmissions to the STA 1408.

Figure 14B:
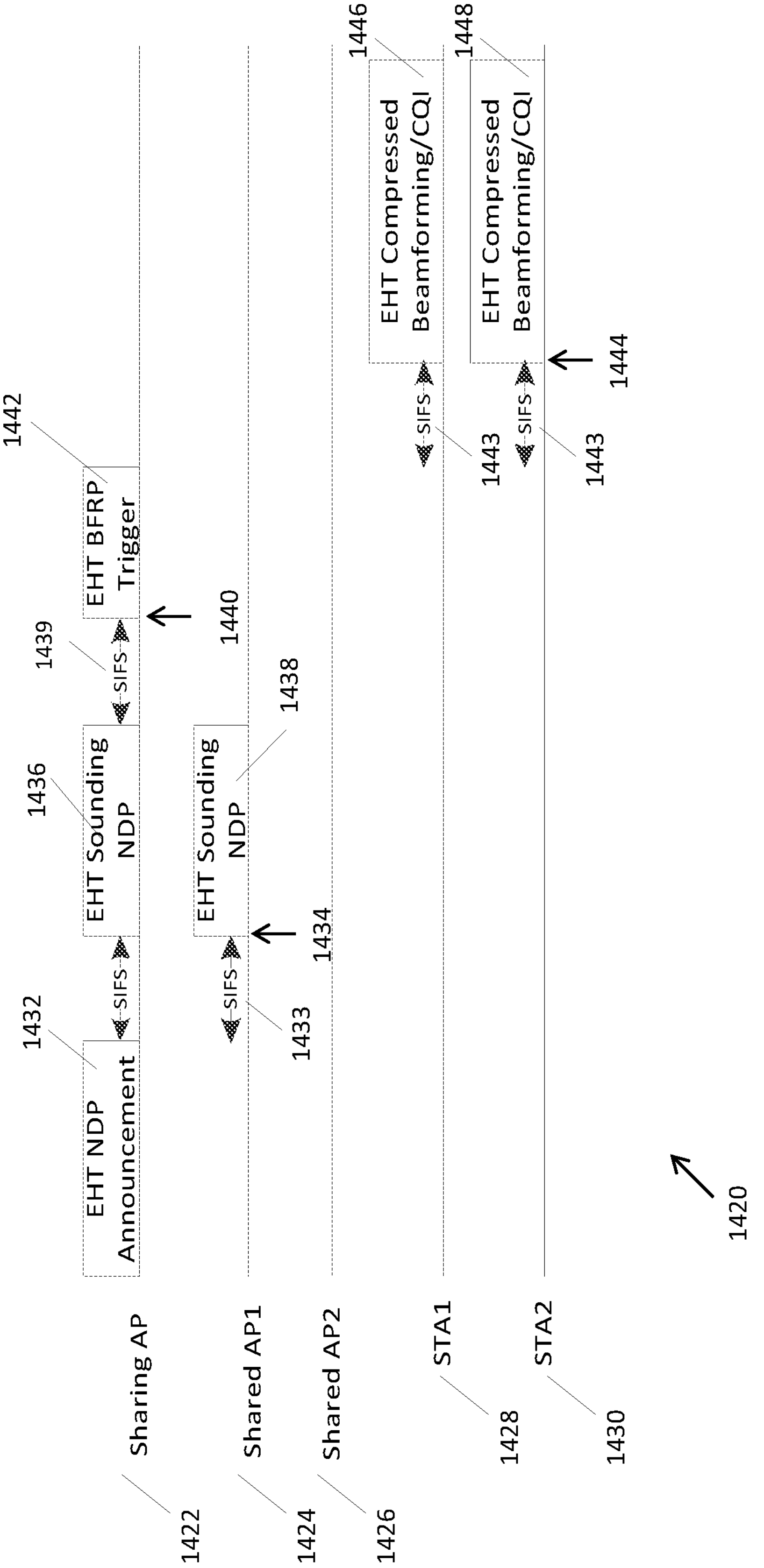
FIG. 14B depicts a flow chart illustrating multi-AP based hybrid joint sounding procedure according to another embodiment.

FIG. 14B depicts a flow chart illustrating a multi-AP based hybrid joint sounding procedure 1420 between multiple APs 1422, 1424, 1426 and multiple STAs 1428, 1430 in an 11be EHT WLAN according to an embodiment. In this embodiment, sharing AP 1422 and shared AP1 1424 are group 1 APs, whereas shared AP2 1426 is a group 2 AP. The multi-AP base hybrid joint sounding procedure 1420 may start when the sharing AP 1422 transmits an EHT NDP Announcement frame 1432 to all shared AP(s) that participate into the sounding procedure 1420 (e.g. shared APs 1424, 1426) and intended STAs 1428, 1430. The EHT NDP Announcement frame 1432 may indicate group 2 APs and group 1 APs in which each of the group 1 APs may transmit an EHT Sounding NDP to intended STA1 1428 and STA2 1430. The EHT NDP Announcement frame 1432 may indicate sounding RU allocation and sounding SS allocation for each of group 1 APs. The EHT NDP Announcement frame 1432 may indicate sounding RU allocation and sounding SS allocation for each of the STA1 1428 and STA2 1430. In particular, data RU allocation and data SS allocation for each of the STA1 1428 and STA2 1430 are indicated in the corresponding EHT BFRP Trigger frame 1442. Sounding SSs may include data SSs. In other words, the number of sounding SSs may be equal to or larger than number of data SSs. Data RU allocation may be the same as sounding RU allocation for each STA. The EHT NDP Announcement frame 1432 may indicate request sounding feedback parameters for each of the intended STAs 1428, 1430 such as feedback bandwidth, feedback type, subcarrier grouping, quantization resolution and number of columns in compressed beamforming feedback matrix. The feedback type is one of SU feedback, MU feedback and CQI feedback. Upon transmission of the EHT NDP Announcement frame 1432, a SIFS 1433 may take effect, and at 1434, sharing AP 1422 and shared AP1 1424 may transmit respective EHT Sounding NDPs 1436, 1438 to STA1 1428 and STA2 1430. After the last symbols of the EHT Sounding NDPs 1436, 1438 are transmitted, a SIFS 1439 may take effect, and at 1440, the sharing AP 1422 may transmit an EHT BFRP Trigger frame 1442 to solicit simultaneous transmissions of sounding feedback information from the STA1 1428 and STA2 1430. Upon reception of the EHT BFRP Trigger frame 1442, a SIFS 1443 may take effect, and at 1444, the STA1 1428 and STA2 1430 simultaneously transmit respective EHT Compressed Beamforming/CQI frames 1446, 1448 comprising sounding feedback information to the sharing AP 1422 and shared AP1 1424. It is noted that the EHT-LTF fields of EHT PPDUs containing the EHT Compressed Beamforming/CQI frames 1446, 1448 can also be used for CSI estimation for implicit sounding with group 2 AP(s), e.g. shared AP2 1426. Based on the received sounding feedback information from the STA1 1428 and STA2 1430, the sharing AP 1422 and shared AP1 1424 may be able to determine a steering matrix and/or allocate appropriate RUs for each of the STA1 1428 and STA2 1430 for subsequent transmissions to the STA1 1428 and/or STA2 1430. Further, the shared AP2 1426 may be able to estimate UL CSI from the EHT-LTF field of EHT PPDU containing the EHT Compressed Beamforming/CQI frame 1446 and determine DL CSI for the STA1 1428 by compensating the UL CSI according to the calibration parameters which were obtained through a calibration procedure; and then the shared AP2 1426 may be able to determine a steering matrix and/or allocate appropriate RUs for the STA1 1428 based on the DL CSI for subsequent transmissions to the STA1 1428. Similarly, the shared AP2 1426 may be able to estimate UL CSI from the EHT-LTF field of EHT PPDU containing the EHT Compressed Beamforming/CQI frame 1448 and determine DL CSI for the STA 1430 by compensating the UL CSI according to the calibration parameters which were obtained through a calibration procedure; and then the shared AP2 1426 may be able to determine a steering matrix and/or allocate appropriate RUs for the STA 1430 based on the DL CSI for subsequent transmissions to the STA 1430.

Figure 15:
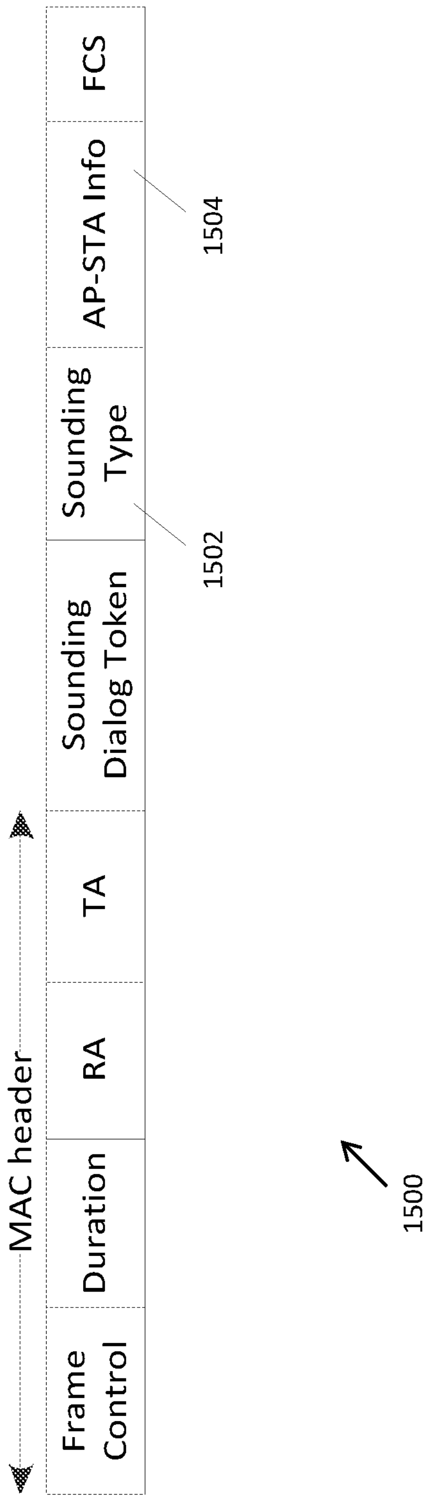
FIG. 15 depicts an example format of an EHT Null Data Packet (NDP) Announcement frame.

FIG. 15 depicts an example format of an EHT NDP Announcement frame 1500. The EHT NDP Announcement frame 1500 may include (or consist of) a Frame Control field, a Duration field, a RA (recipient STA address) field, a TA (transmitting STA address) field, a Sounding Dialog Token field, a Sounding Type field 1502 and an AP-STA Info field 1504 and a FCS field. The Frame Control field, the Duration field, the RA field and the TA field may be grouped as MAC header.

Figure 16A:
FIG. 16A depicts an example format of a STA Feedback Info field when the Sounding Type field refers to single-AP based explicit sounding.

When the Sounding Type field 1502 refers to single-AP based explicit sounding. The AP-STA Info field 1504, for single-AP based explicit sounding, may comprise one or more STA Feedback Info field 1602 as shown in FIG. 16A. A STA Feedback Info field 1602 may include (or consist of) an Intended STA field, a Feedback Bandwidth field, a Feedback Type field an Subcarrier Grouping field, a Quantization Resolution field and a Number of Columns of Compressed Beamforming Feedback Matrix field. In an embodiment, a STA Feedback Info field is used to indicate requested sounding feedback parameters for a STA indicated in the Intended STA field.

Figure 16B:
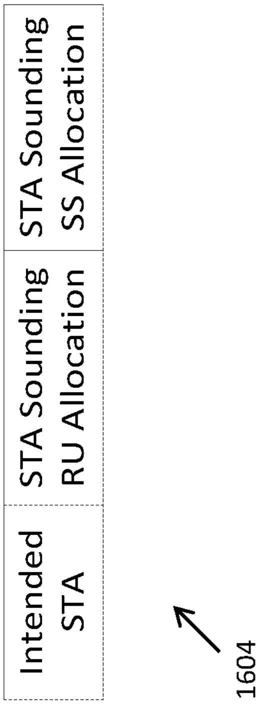
FIG. 16B depicts an example format of a STA Sounding Info field when the Sounding Type field refers to single-AP based implicit sounding.

When the Sounding Type field 1502 refers to single-AP based implicit sounding, the AP-STA Info field 1504, for single-AP based implicit sounding, may comprise one or more STA Sounding Info field 1604 as shown in FIG. 16B.

A STA Sounding Info field 1604 may include (or consist of) an Intended STA field, a STA Sounding RU Allocation field and a STA Sounding SS Allocation field. In an embodiment, a STA Sounding Info field is used to indicate sounding RU allocation and sounding SS allocation for a STA indicated in the Intended STA field.

Figure 16C:
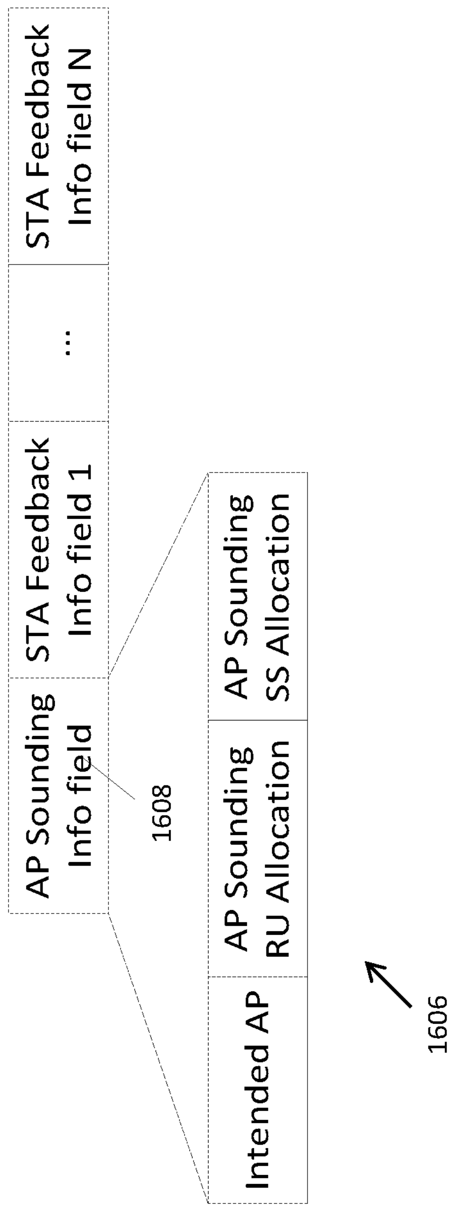
FIG. 16C depicts an example format of an AP-STA Explicit Sounding Info field when the Sounding Type field refers to multi-AP based explicit sounding.

When the Sounding Type field 1502 refers to multi-AP based explicit sounding, the AP-STA Info field 1504, for multi-AP based explicit sounding, may comprise one or more AP-STA Explicit Sounding Info field 1606 as shown in FIG. 16C. An AP-STA Explicit Sounding Info field 1606 may include (or consist of) an AP Sounding Info field 1608 and one or more STA Feedback Info field 1602 as shown in FIG. 16A. The AP Sounding Info field 1608 may further include an Intended AP field, an AP Sounding RU Allocation field and an AP Sounding SS Allocation field. In an embodiment, an AP-STA Explicit Sounding Info field is used to indicate sounding RU allocation and sounding SS allocation for an AP indicated in the Intended AP field and the corresponding sounding feedback parameters for each STA.

When the Sounding Type field 1502 refers to multi-AP based implicit sounding, the AP-STA Info field 1504, for multi-AP based implicit sounding, may comprise one or more Intended AP fields and one or more STA Sounding Info field 1604 as illustrated in FIG. 16B. In one embodiment, the one or more Intended AP fields are used to indicate shared AP(s) that participate into the multi-AP based implicit sounding and the one or more STA Sounding Info fields are used to indicate sounding RU allocation and sounding SS allocation for each intended STA.

Further, when the Sounding Type field 1502 refers to multi-AP based hybrid sounding, the AP-STA Info field 1504 may comprises one or more AP-STA Explicit Sounding Info field 1606 as shown in FIG. 16C that indicates necessary information for explicit sounding portion of the multi-AP based hybrid sounding; one or more Intended AP fields and one or more STA Sounding Info field 1604 as shown in FIG. 16B that indicate necessary information for implicit sounding portion of the multi-AP based hybrid sounding.

Figure 17:
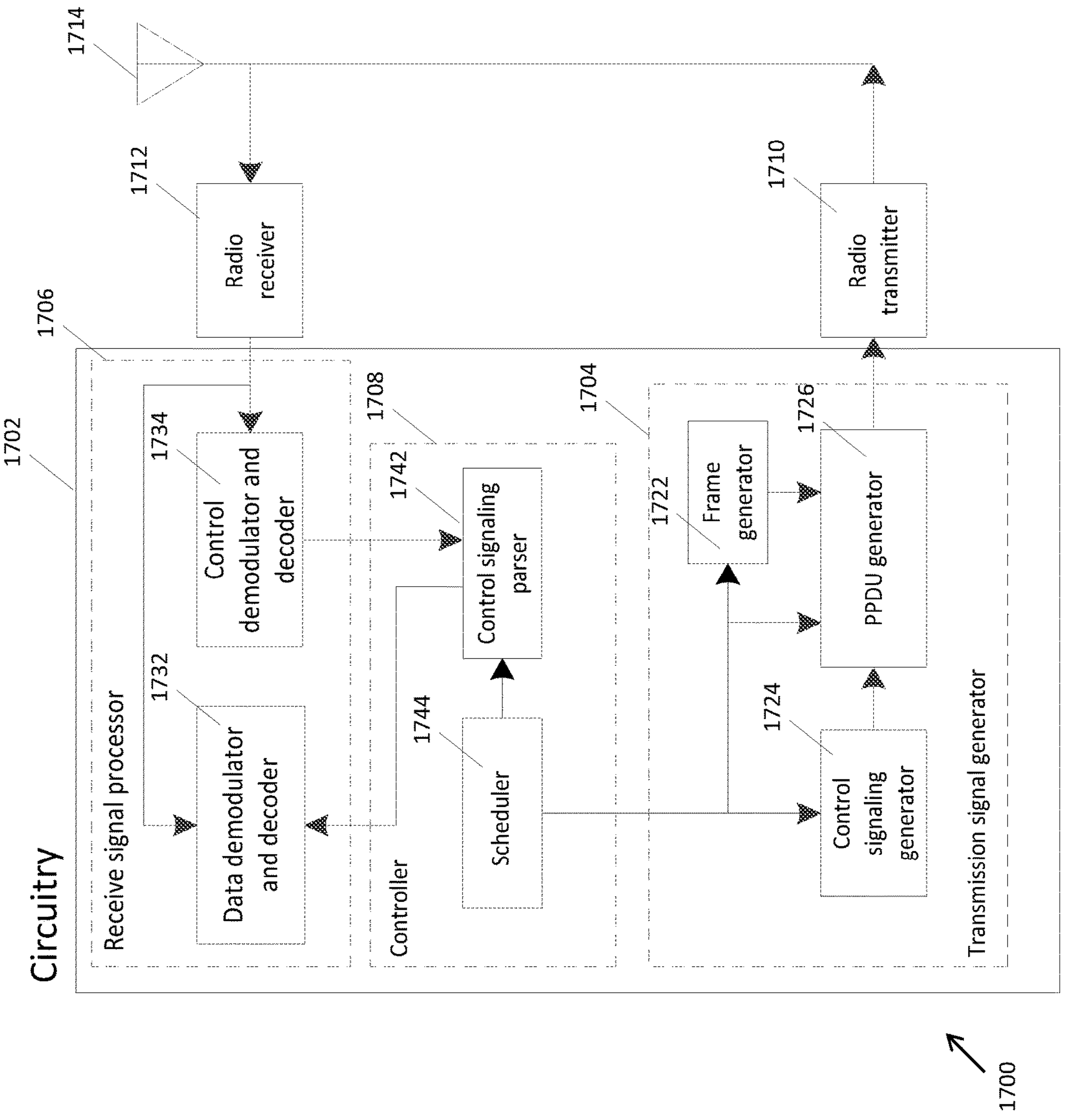
FIG. 17 shows a configuration of a communication device, for example an AP, according to the present disclosure.

FIG. 17 shows a configuration of a communication device, for example an AP, according to the present disclosure. Similar to the schematic example of the communication apparatus 300 shown in FIG. 3A, the communication apparatus 1700 includes circuitry 1702, at least one radio transmitter 1710, at least one radio receiver 1712, at least one antenna 1714 (for the sake of simplicity, only one antenna is depicted in FIG. 17). The circuitry 1702 may include at least one controller 1708 for use in software and hardware aided execution of tasks that the controller 1708 is designed to perform communication for channel sounding. The circuitry 1702 may further include a transmission signal generator 1704 and a receive signal processor 1706. The at least one controller 1708 may control the transmission signal generator 1704 and the receive signal processor 1706. The transmission signal generator 1704 may include a frame generator 1722, a control signaling generator 1724, and a PPDU generator 1726. The frame generator 1722 may generate MAC frames, e.g. EHT NDP Announcement frames, EHT Action frames or EHT BFRP Trigger frames. The control signaling generator 1724 may generate control signaling fields of PPDUs to be generated (e.g. EHT-SIG fields of EHT Sounding NDPs or EHT-SIG fields of EHT PPDUs comprising EHT NDP Announcement frames, EHT Action frames or EHT BFRP Trigger frames). The PPDU generator 1726 may generate PPDUs (e.g. EHT Sounding NDPs or EHT PPDUs comprising EHT NDP Announcement frames, EHT Action frames or EHT BFRP Trigger frames).

The receive signal processor 1706 may include a data demodulator and decoder 1734, which may demodulate and decode data portions of the received signals (e.g. data fields of EHT PPDUs comprising EHT NDP Announcement frames, EHT Action frames or EHT BFRP Trigger frames). The receive signal processor 1706 may further include a control demodulator and decoder 1734, which may demodulate and decode control signaling portions of the received signals (e.g. EHT-SIG fields of EHT Sounding NDPs or EHT-SIG fields of EHT PPDUs comprising EHT Compressed Beamforming/CQI frames). The at least one controller 1708 may include a control signal parser 1742 and a scheduler 1744. The scheduler 1744 may determine RU information and user-specific allocation information for allocations of downlink SU or MU transmissions and triggering information for allocations of uplink MU transmissions. The control signal parser 1742 may analyse the control signaling portions of the received signals and the triggering information for allocations of uplink MU transmissions shared by the scheduler 1744 and assist the data demodulator and decoder 1732 in demodulating and decoding the data portions of the received signals (e.g. data fields of EHT PPDUs comprising EHT Compressed Beamforming/CQI frames).

Figure 18:
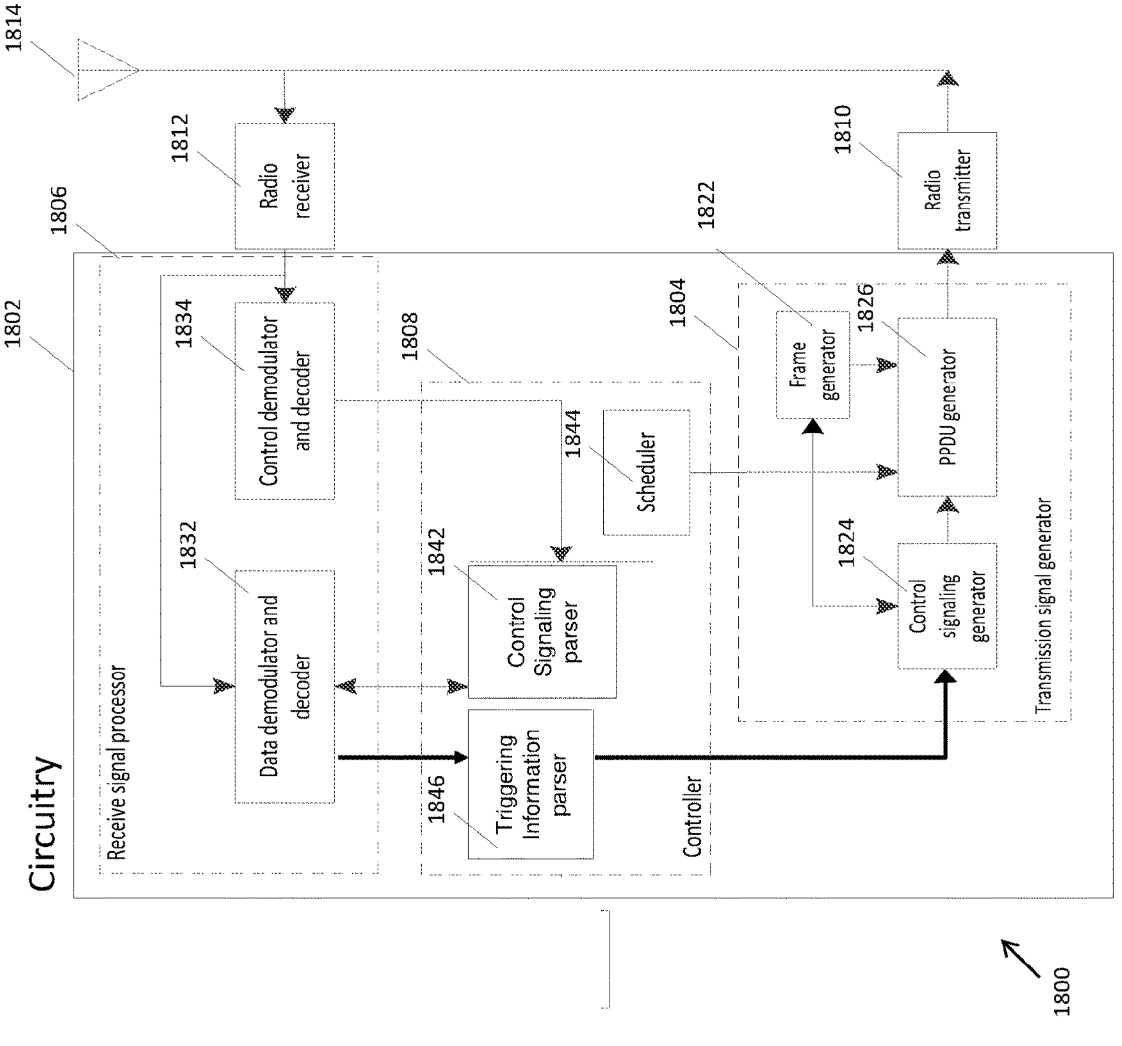
FIG. 18 shows a configuration of a communication device, for example an STA, according to the present disclosure.

FIG. 18 shows a configuration of a communication device, for example an STA, according to the present disclosure. Similar to the schematic example of communication apparatus 300 shown in FIG. 3A, the communication apparatus 1800 includes circuitry 1802, at least one radio transmitter 1810, at least one radio receiver 1812, at least one antenna 1814 (for the sake of simplicity, only one antenna is depicted in FIG. 18). The circuitry 1802 may include at least one controller 1808 for use in software and hardware aided execution of tasks that the controller 1808 is designed to perform communication for channel sounding. The circuitry 1802 may further include a receive signal processor 1804 and a transmission signal generator 1806. The at least one controller 1808 may control the receive signal processor 1804 and the transmission signal generator 1806. The receive signal processor 1804 may include a data demodulator and decoder 1832 and a control demodulator and decoder 1834. The control demodulator and decoder 1834 may demodulate and decode control signaling portions of the received signals (e.g. EHT-SIG fields of EHT Sounding NDPs or EHT-SIG fields of EHT PPDUs comprising EHT NDP Announcement frames or EHT BFRP Trigger frames). The data demodulator and decoder 1032 may demodulate and decode data portions of the received signals (e.g. data fields of EHT PPDUs comprising EHT NDP Announcement frames or EHT BFRP Trigger frames) according to RU information and user-specific allocation information of its own allocations.

The at least one controller 1808 may include a control signal parser 1842, and a scheduler 1844 and a trigger information parser 1846. The control signal parser 1842 may analyse the control signaling portions of the received signals (e.g. EHT-SIG fields of EHT Sounding NDPs or EHT-SIG fields of EHT PPDUs comprising EHT NDP Announcement frames or EHT BFRP Trigger frame) and assist the data demodulator and decoder 1832 in demodulating and decoding the data portions of the received signals (e.g. data fields of EHT PPDUs comprising EHT NDP Announcement frames or EHT BFRP Trigger frames). The triggering information parser 1848 may analyse the triggering information for its own uplink allocations from the received triggering frames contained in the data portions of the received signals. The transmission signal generator 1804 may include a control signaling generator 1824, which may generate control signaling fields of PPDUs to be generated (e.g. EHT-SIG fields of EHT Sounding NDPs or EHT-SIG fields of EHT PPDUs comprising EHT Compressed Beamforming/CQI frames). The transmission signal generator 1804 may further include a PPDU generator 1826, which generate PPDUs (e.g. EHT Sounding NDPs or EHT PPDUs comprising EHT Compressed Beamforming/CQI frames). The transmission signal generator 1804 may further include a frame generator 1822 may generate MAC frames, e.g. EHT Compressed Beamforming/CQI frames.

As described above, the embodiments of the present disclosure provide an advanced communication system, communication methods and communication apparatuses for channel sounding in MIMO WLAN networks and improve spectral efficiency in MIMO WLAN networks.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g. cellular (cell) phone, smart phone), a tablet, a personal computer (PC) (e.g. laptop, desktop, netbook), a camera (e.g. digital still/video camera), a digital player (digital audio/video player), a wearable device (e.g. wearable camera, smart watch, tracking device), a game console, a digital book reader, a telehealth/telemedicine (remote health and medicine) device, and a vehicle providing communication functionality (e.g. automotive, airplane, ship), and various combinations thereof.

The communication apparatus is not limited to be portable or movable, and may also include any kind of apparatus, device or system being non-portable or stationary, such as a smart home device (e.g. an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be understood that while some properties of the various embodiments have been described with reference to a device, corresponding properties also apply to the methods of various embodiments, and vice versa.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

The invention claimed is:

1. A first access point comprising:
- circuitry, which, in operation, generates a sounding setup request frame indicating an intended usage of a sounding procedure;
- a transmitter, which, in operation:
  - transmits the sounding setup request frame to a second access point; and
  - transmits a Null Data Packet (NDP) Announcement frame after the transmission of the sounding setup request frame; and
- a receiver, which in operation, receives a sounding setup response frame from the second access point after transmission of the sounding setup request frame and before transmission of the NDP Announcement frame,
- wherein the transmitter, in operation, transmits the NDP Announcement frame in response to receiving the sounding setup response frame from the second access point.

2. The first access point of claim 1, wherein the sounding setup request frame comprises a first field which indicates an intended type of the sounding procedure.

3. The first access point of claim 1, wherein the sounding setup request frame comprises a second field which indicates one or more intended communication apparatuses which will be engaged in the sounding procedure.

4. The first access point of claim 1, wherein the sounding setup response frame received from the second access point comprises a first field which indicates one or more recommended type of the sounding procedure.

5. The first access point of claim 4, wherein the first field of the sounding setup response frame received from the second access point indicates that the second access point is to be exempted from the sounding procedure.

6. The first access point of claim 1, wherein the circuitry, in operation, generates the NDP Announcement frame which starts the sounding procedure.

7. The first access point of claim 6, wherein the NDP Announcement frame comprises a first field which indicates a type of the sounding procedure and a second field which indicates a type of sounding feedback.

8. The first access point of claim 7, wherein when the type of the sounding procedure refers to an explicit sounding procedure and the type of the sounding feedback refers to calibration feedback, the sounding procedure includes a calibration procedure.

9. The first access point of claim 1, wherein when the sounding procedure is a hybrid sounding procedure comprising an explicit sounding portion and an implicit sounding portion, one access point among the first access point and the second access point is configured to be engaged in the explicit sounding portion of the sounding procedure, and the other access point among the first access point and the second access point is configured to be engaged in the implicit sounding portion of the sounding procedure.

10. The first access point of claim 1, wherein the sounding setup request frame requests the second access point to transmit the sounding setup response frame.

11. The first access point of claim 1, wherein, the transmitter, in operation, transmits the sounding setup request frame to a plurality of other access points, the plurality of other access points including the second access point;

the receiver, in operation, receives sounding setup response frames from the plurality of other access points; and the transmitter, in operation, transmits the NDP Announcement frame in response to receiving a respective sounding setup response frame from each of the plurality of other access points.

12. A communication method performed by a first access point, the communication method comprising:

generating a sounding setup request frame indicating an intended usage of a sounding procedure;

transmitting the sounding setup request frame to a second access point;

receiving, after transmitting the sounding setup request frame and before transmitting a Null Data Packet (NDP) Announcement frame, a sounding setup response frame from the second access point; and transmitting, in response to receiving the sounding setup response frame from the second access point, the NDP Announcement frame.

* * * * *